United States Patent
Lim et al.

(10) Patent No.: US 10,558,087 B2
(45) Date of Patent: Feb. 11, 2020

(54) LIQUID CRYSTAL DISPLAY AND MANUFACTURING METHOD THEREOF

(71) Applicant: SAMSUNG DISPLAY CO., LTD., Yongin-si, Gyeonggi-Do (KR)

(72) Inventors: Ho Lim, Suwon-si (KR); Duck Jong Suh, Gwangmyeong-si (KR); Gi Hoon Yang, Ansan-si (KR); Suk-Kung Chei, Suwon-si (KR); Min-Joo Han, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 11 days.

(21) Appl. No.: 15/601,163

(22) Filed: May 22, 2017

(65) Prior Publication Data
US 2018/0046034 A1    Feb. 15, 2018

(30) Foreign Application Priority Data

Aug. 9, 2016    (KR) .................. 10-2016-0101234

(51) Int. Cl.
*G02F 1/133*    (2006.01)
*G02F 1/1337*    (2006.01)
(Continued)

(52) U.S. Cl.
CPC ........ *G02F 1/133711* (2013.01); *C09K 19/56* (2013.01); *G02F 1/13378* (2013.01);
(Continued)

(58) Field of Classification Search
CPC .................................... C09K 19/12
See application file for complete search history.

(56) References Cited

U.S. PATENT DOCUMENTS

| 7,648,646 B2 | 1/2010 | Harding et al. |
| 7,749,575 B2 | 7/2010 | Kataoka et al. |

(Continued)

FOREIGN PATENT DOCUMENTS

| KR | 100816142 | 3/2008 |
| KR | 1020130096456 | 8/2013 |

(Continued)

*Primary Examiner* — Chanceity N Robinson
(74) *Attorney, Agent, or Firm* — F. Chau & Associates, LLC

(57) ABSTRACT

The present invention provides a liquid crystal display including: a first substrate; a second substrate configured to be separated from and overlap the first substrate; a liquid crystal layer disposed between the first substrate and the second substrate and including liquid crystal molecules; a first polymer layer disposed between the first substrate and the liquid crystal layer; a second polymer layer disposed between the second substrate and the liquid crystal layer; and a plurality of protrusions disposed in at least one of a first position between the first polymer layer and the liquid crystal layer and a second position between the second polymer layer and the liquid crystal layer, in which the protrusions include polymers of reactive mesogens, and the first polymer layer and the second polymer layer include a polymer of a compound represented by Chemical Formula 1.

[Chemical Formula 1]

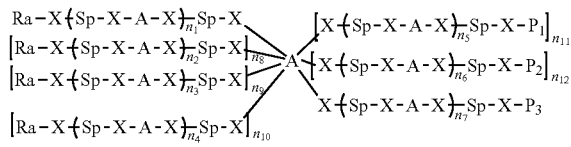

9 Claims, 7 Drawing Sheets

(51) Int. Cl.
*C09K 19/56* (2006.01)
*G02F 1/1343* (2006.01)

(52) U.S. Cl.
CPC .. *G02F 1/133707* (2013.01); *G02F 1/134309* (2013.01); *G02F 2001/133726* (2013.01); *G02F 2202/023* (2013.01)

(56) References Cited

U.S. PATENT DOCUMENTS

2013/0182202 A1   7/2013  Graziano et al.
2016/0032189 A1*  2/2016  Baron ................ C09K 19/3003
                                                          349/139

FOREIGN PATENT DOCUMENTS

| KR | 101607479 | 3/2016 |
|----|-----------|--------|
| KR | 101618785 | 4/2016 |

* cited by examiner (a)

(b)

(c)

LIQUID CRYSTAL DISPLAY AND MANUFACTURING METHOD THEREOF

CROSS-REFERENCE TO RELATED APPLICATION

This application claims priority under 35 U.S.C. § 119 to Korean Patent Application No. 10-2016-0101234, filed in the Korean Intellectual Property Office on Aug. 9, 2016, the entire contents of which are herein incorporated by reference.

TECHNICAL FIELD

The present invention relates to a liquid crystal display and a manufacturing method thereof.

DISCUSSION OF RELATED ART

A liquid crystal display includes two display panels with field generating electrodes such as a pixel electrode and a common electrode, and a liquid crystal layer interposed therebetween.

The liquid crystal display generates an electric field in the liquid crystal layer by applying voltages to the field generating electrodes, determines the orientation of liquid crystal molecules of the liquid crystal layer by the generated electric field, and controls polarization of incident light by the determined orientation of the liquid crystal molecules so as to display images.

The liquid crystal layer having various characteristics may control the transmittance of light in various way and may allow the liquid crystal display to achieve various desired images. In particular, with various uses of liquid crystal displays, various characteristics are required, such as low-voltage driving, a high voltage holding ratio (VHR), a wide viewing angle, a wide operation temperature range, and high-speed response.

To obtain a high-speed response characteristic for a liquid crystal display, studies for enhancing the physical properties, such as rotation viscosity, refractive index, and elastic coefficient of the liquid crystal composition, are in progress.

SUMMARY

Exemplary embodiments provide a liquid crystal display and a method of manufacturing the same, in which a forming process of a polyimide alignment layer can be omitted, and an afterimage characteristic of the liquid crystal display can be ameliorated.

An exemplary embodiment of the present invention provides a liquid crystal display including: a first substrate; a second substrate configured to be separated from and overlap the first substrate; a liquid crystal layer disposed between the first substrate and the second substrate and including liquid crystal molecules; a first polymer layer disposed between the first substrate and the liquid crystal layer; a second polymer layer disposed between the second substrate and the liquid crystal layer; and a plurality of protrusions disposed in at least one of a first position between the first polymer layer and the liquid crystal layer and a second position between the second polymer layer and the liquid crystal layer, wherein the plurality of protrusions include polymers of reactive mesogens, and the first polymer layer and the second polymer layer include a polymer of a compound represented by Chemical Formula 1.

[Chemical Formula 1]

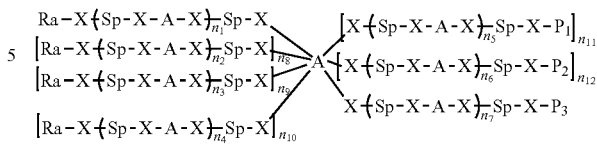

In Chemical Formula 1, "A" may include a compound which includes one or more of C, N, an aromatic ring, a heteroaromatic ring, an aliphatic ring, a heterocyclic ring, a condensed ring thereof, a tertiary amine, and two or more ring compounds linked to each other, "X" may be independently selected from one of a single bond, —O—, —S—, —CO—, —CO—O—, —OCO—, —O—CO—O—, —OCH$_2$—, —SCH$_2$—, —CH$_2$S—, —CF$_2$O—, —OCF$_2$—, —CF$_2$S—, —SCF$_2$—, —(CH$_2$)$_l$—, —CF$_2$CH$_2$—, —CH$_2$CF$_2$—, —(CF$_2$)$_l$—, —CF=CF—, —C≡C—, —CH=CH—COO—, —OCO—CH=CH—, —R$^O$—, —CH(-Sp-P$^O$)—, —CH$_2$CH(-Sp-P$_0$)—, and —CH(-Sp-P$_0$)CH(-Sp-P$_0$)—, "Sp" is a spacer or a single bond, P$_0$, P$_1$, P$_2$, and P$_3$ may be independently selected from one of

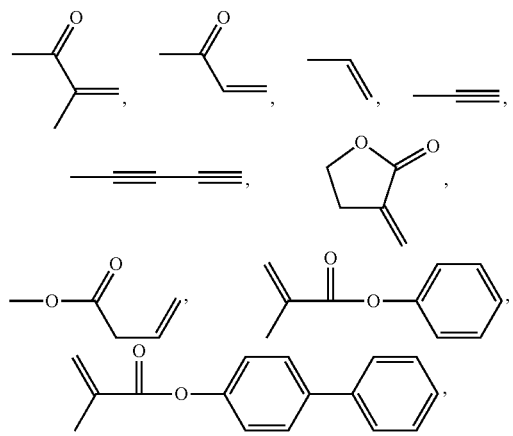

"Ra" may be selected from one of —H, —F, —OH, —NH$_2$, —CN, —B(OH)$_2$, —SH, —Br, —I, a heteroaromatic ring, a heterocyclic ring, —OCH$_3$, —OCH$_2$CH$_3$, —OCH$_2$CH$_2$CH$_3$, —O—(CH$_2$—CH$_2$)$_m$—OCH$_3$, —NH(CH$_2$)$_m$CH$_3$, —N((CH$_2$)$_m$CH$_3$)$_2$,

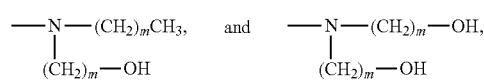

"m" may independently be an integer that is in a range of 1 to 4, "l" may independently be an integer that is in a range of 1 to 4, "n$_1$" to "n$_{12}$" may independently be an integer that is in a range of 0 to 1, preferably n$_{12}$ is 1, and "R$^O$" may be a C1-C12 alkyl group.

An exemplary embodiment of the present invention provides a manufacturing method of a liquid crystal display, including: preparing a first substrate and a second substrate which face each other; forming a liquid crystal layer between the first substrate and the second substrate to include a plurality of liquid crystal molecules, reactive mesogens, and a compound represented by Chemical Formula 1; and irradiating an ultraviolet (UV) light to the first substrate and the second substrate.

[Chemical Formula 1]

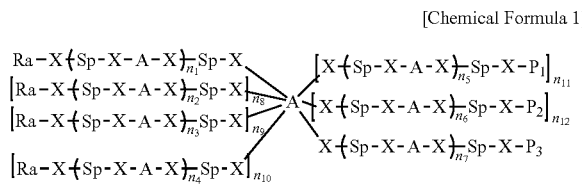

In Chemical Formula 1, "A" may include a compound which includes one or more of C, N, an aromatic ring, a heteroaromatic ring, an aliphatic ring, a heterocyclic ring, a condensed ring thereof, a tertiary amine, and two or more ring compounds linked to each other, "X" may be independently selected from one of a single bond, —O—, —S—, —CO—, —CO—O—, —OCO—, —O—CO—O—, —OCH$_2$—, —SCH$_2$—, —CH$_2$S—, —CF$_2$O—, —OCF$_2$—, —CF$_2$S—, —SCF$_2$—, —(CH$_2$)$_l$—, —CF$_2$CH$_2$—, —CH$_2$CF$_2$—, —(CF$_2$)$_l$—, —CF=CF—, —C≡C—, —CH=CH—COO—, —OCO—CH=CH—, —R$^O$—, —CH(-Sp-P$_0$)—, —CH$_2$CH(-Sp-P$_0$)—, and —CH(-Sp-P$_0$)CH(-Sp-P$_0$)—, "Sp" is a spacer or a single bond, P$_0$, P$_1$, P$_2$, and P$_3$ may be independently selected from one of

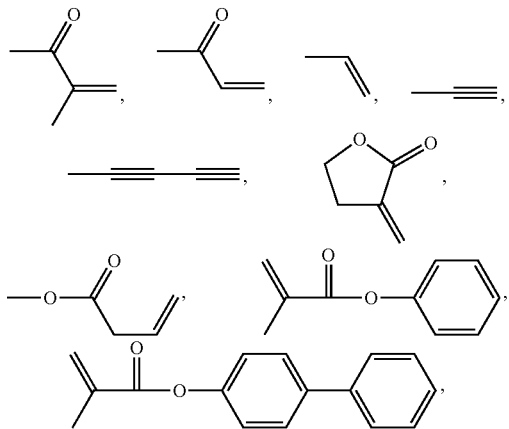

"Ra" may be selected from one of —H, —F, —OH, —NH$_2$, —CN, —B(OH)$_2$, —SH, —Br, —I, a heteroaromatic ring, a heterocyclic ring, —OCH$_3$, —OCH$_2$CH$_3$, —OCH$_2$CH$_2$CH$_3$, —O—(CH$_2$—CH$_2$)m-OCH$_3$, —NH(CH$_2$)CH$_3$, —N((CH$_2$)$_m$CH$_3$)$_2$,

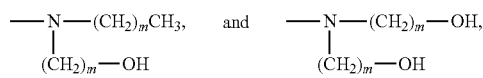

"m" may independently be an integer that is in a range of 1 to 4, "l" may independently be an integer that is in a range of 1 to 4, "n$_1$" to "n$_{12}$" may independently be an integer that is in a range of 0 to 1, preferably n$_{12}$ is 1, and "R$^O$" may be a C1-C12 alkyl group.

An exemplary embodiment of the present invention provides a liquid crystal display including: a first substrate; a second substrate configured to face the first substrate; a liquid crystal layer disposed between the first substrate and the second substrate and including liquid crystal molecules; a first polymer layer disposed between the first substrate and the liquid crystal layer; a second polymer layer disposed between the second substrate and the liquid crystal layer; and a plurality of protrusions disposed between the first polymer layer and the liquid crystal layer and between the second polymer layer and the liquid crystal layer, in which the plurality of protrusions may include polymers of reactive mesogens, the first polymer layer and the second polymer layer may include an alignment polymer which is not polyimide, the alignment polymer may be formed from a polymerizable compound including two or more vertical alignment groups and at least one anchoring group connected with a central group, the two or more vertical alignment groups may each include a chain structure with a reactive end group, and the at least one anchoring group may hydrogen bond the alignment polymer of the first polymer layer to the first substrate and may hydrogen bond the alignment polymer of the second polymer layer to the second substrate.

BRIEF DESCRIPTION OF THE DRAWINGS

Exemplary embodiments of the present invention will be more clearly understood from the following detailed description taken in conjunction with the accompanying drawings in which.

Figure 1:
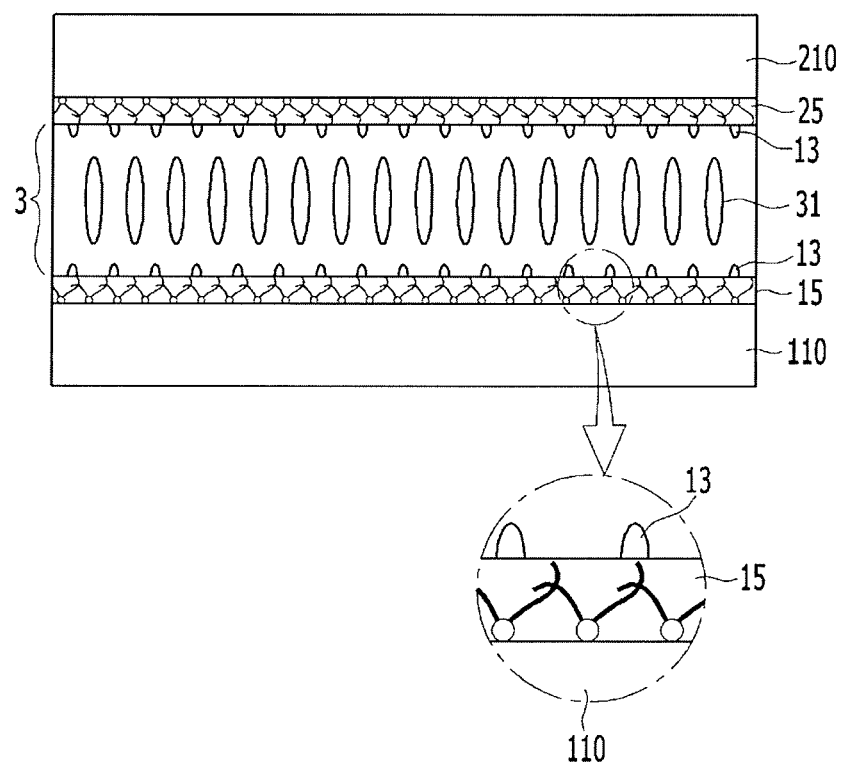
FIG. 1 is a schematic cross-sectional view of a liquid crystal display according to an exemplary embodiment of the present invention.

Since the drawings in FIGS. 1-7 are intended for illustrative purposes, the elements in the drawings are not necessarily drawn to scale. For example, some of the elements may be enlarged or exaggerated for clarity purpose.

DETAILED DESCRIPTION OF THE EMBODIMENTS

The present invention will be described more fully hereinafter with reference to the accompanying drawings, in which exemplary embodiments of the present invention are shown. As those skilled in the art would realize, the described embodiments may be modified in various different ways, all without departing from the spirit and scope of the present invention.

To clearly describe the present invention, parts that are irrelevant to the description are omitted, and like numerals refer to like or similar constituent elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" may mean positioned on or below the object portion, and does not necessarily mean positioned on the upper side of the object portion based on a gravitational direction.

As used herein, the singular forms "a", "an" and "the" are intended to include the plural forms as well, unless the context clearly indicates otherwise. In addition, unless explicitly described to the contrary, the word "comprise" and variations such as "comprises" or "comprising" will be understood to imply the inclusion of stated elements but not the exclusion of any other elements. Further, in the specification, the phrase "a plan layout view" means that an object portion is viewed from above, and the phrase "a cross-sectional view" means that a cross-section taken by vertically cutting an object portion is viewed from the side.

Hereinafter, a liquid crystal display according to an exemplary embodiment of the present invention will be described in conjunction with the drawings.

FIG. 1 is a schematic cross-sectional view of a liquid crystal display according to an exemplary embodiment of the present invention. Referring to FIG. 1, the liquid crystal display according to the present exemplary embodiment includes a liquid crystal layer 3 which includes a plurality of liquid crystal molecules 31 positioned between a first substrate 110 and a second substrate 210, and a first polymer layer 15 is disposed between the first substrate 110 and the liquid crystal layer 3. In addition, a second polymer layer 25 is disposed between the second substrate 210 and the liquid crystal layer 3.

A plurality of protrusions 13 are disposed between the first polymer layer 15 and the liquid crystal layer 3 and between the second polymer layer 25 and the liquid crystal layer 3. The protrusions 13 include polymers formed by photopolymerizing reactive mesogens. Mesogen is a compound that displays liquid crystal properties. Reactive mesogens described here are ultraviolet (UV) light curable.

The first polymer layer 15 and the second polymer layer 25 illustrated in FIG. 1 include polymers formed by photopolymerizing compounds represented by Chemical Formula 1.

[Chemical Formula 1]

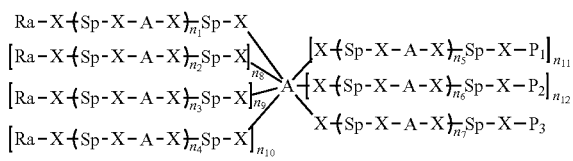

In Chemical Formula 1, "A" includes a compound which includes one or more of C, N, an aromatic ring, a heteroaromatic ring, an aliphatic ring, a heterocyclic ring, a condensed ring thereof, a tertiary amine, and two or more ring compounds linked to each other. "X" is independently selected from one of a single bond, —O—, —S—, —CO—, —CO—O—, —OCO—, —O—CO—O—, —OCH$_2$—, —SCH$_2$—, —CH$_2$S—, —CF$_2$O—, —OCF$_2$—, —CF$_2$S—, —SCF$_2$—, —(CH$_2$)$_l$—, —CF$_2$CH$_2$—, —CH$_2$CF$_2$—, —(CF$_2$)$_l$—, —CF═CF—, —C≡C—, —CH═CH—COO—, —OCO— CH═CH—, —R$^0$—, —CH(-Sp-P$_0$)—, —CH$_2$CH(-Sp-P$_0$)—, and —CH(-Sp-P$_0$)CH(-Sp-P$_0$)—. "Sp" is a spacer or a single bond. P$_0$, P$_1$, P$_2$, and P$_3$ are each independently selected from one of

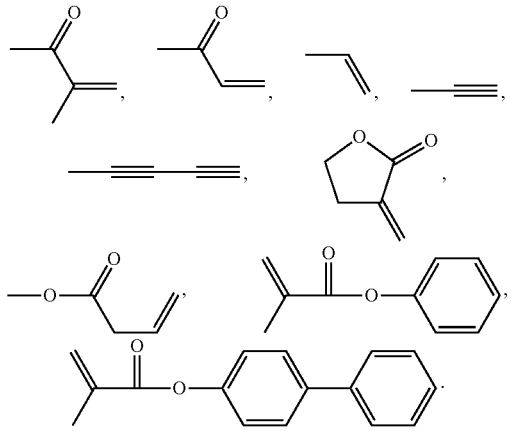

"Ra" is selected from one of —H, —F, —OH, —NH$_2$, —CN, —B(OH)$_2$, —SH, —Br, —I, a heteroaromatic ring, a heterocyclic ring, —OCH$_3$, —OCH$_2$CH$_3$, —OCH$_2$CH$_2$CH$_3$, —O—(CH$_2$—CH$_2$)$_m$—OCH$_3$, —NH (CH$_2$)$_m$CH$_3$, —N((CH$_2$)$_m$C$_3$)$_2$,

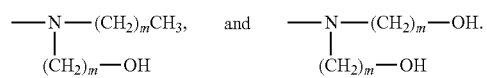

"m" is independently an integer that is in a range of 1 to 4. "l" is independently an integer that is in a range of 1 to 4. "n$_1$" to "n$_{12}$" are independently an integer that is in a range of 0 to 1, and preferably n$_{12}$ is 1. "R$^0$" is a C1-C12 alkyl group.

The spacer may be a divalent linking group connecting adjacent structures, and may be a straight chain C1 to C20 alkylene group. One CH$_2$ group or two or more non-adjacent CH$_2$ groups present in the above alkyl group may be independent from each other, and may be substituted by —O—, —S—, —NH—, —NCH$_3$—, —CO—, —COO—, —OCO—, —OCOO—, —SCO—, —COS—, —CH═CH—, or —C≡C—.

In Chemical Formula 1, when both X and Sp are a single bond, the linkages —X-Sp-, -Sp-X—, and —X-Sp-X— are just one single bond. Each X is independent, and may be the same or different. For example, one X may be —O—, and another X may be a single bond or —O—.

A compound represented by Chemical Formula 1 may include at least one, and preferably two or more vertical alignment groups

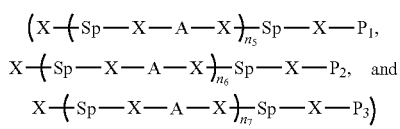

connected with a central compound (A) and at least one anchoring group (Ra). In this case, the anchoring group (Ra) bonds a polymer of the compound represented by Chemical Formula 1 to a first substrate or a second substrate. For example, Ra may include at least one of O, N, S, F, Br and I elements, and may be a H attached to O or S of X, so as to function as an anchoring group to hydrogen bond the polymer of the compound represented by Chemical Formula 1 to the first substrate or the second substrate.

The reactive groups such as $P_1$, $P_2$, and $P_3$ may each be connected with an end of one vertical alignment group, and may polymerize with a reactive group of the compound represented by Chemical Formula 1, adjacent thereto, to form a polymer layer. For example, the $P_1$, $P_2$, or $P_3$ of the compound represented by Chemical Formula 1 may photopolymerize with $P_1$, $P_2$, or $P_3$ of the compound represented by Chemical Formula 1 adjacent thereto to form a polymer layer such as the first polymer layer 15 and the second polymer layer 25.

As the reason set forth above, the liquid crystal display according to the present exemplary embodiment may include a polymer layer in which an alignment layer containing a common polyimide is omitted, and the compound represented by Chemical Formula 1 is polymerized to form the polymer layer instead of a polyimide alignment layer.

The polymer layer may be disposed between the first substrate 110 and the liquid crystal layer 3 and between the second substrate 210 and the liquid crystal layer 3 to align the liquid crystal, similarly to the alignment layer.

The polymer layer according to the present exemplary embodiment is not the alignment layer containing a polyimide, and thus can be manufactured without a coating and drying process of the common alignment layer, thereby simplifying the processes. Besides, the polyimide alignment layer also requires an additional rubbing procedure. In addition, the compound represented by Chemical Formula 1 may include two or more vertical alignment groups, and thus although a small amount thereof is used, it is possible to align the liquid crystal and ameliorate afterimages.

In the liquid crystal display according to the present exemplary embodiment, the compound A represented by Chemical Formula 1 may be selected from one of:

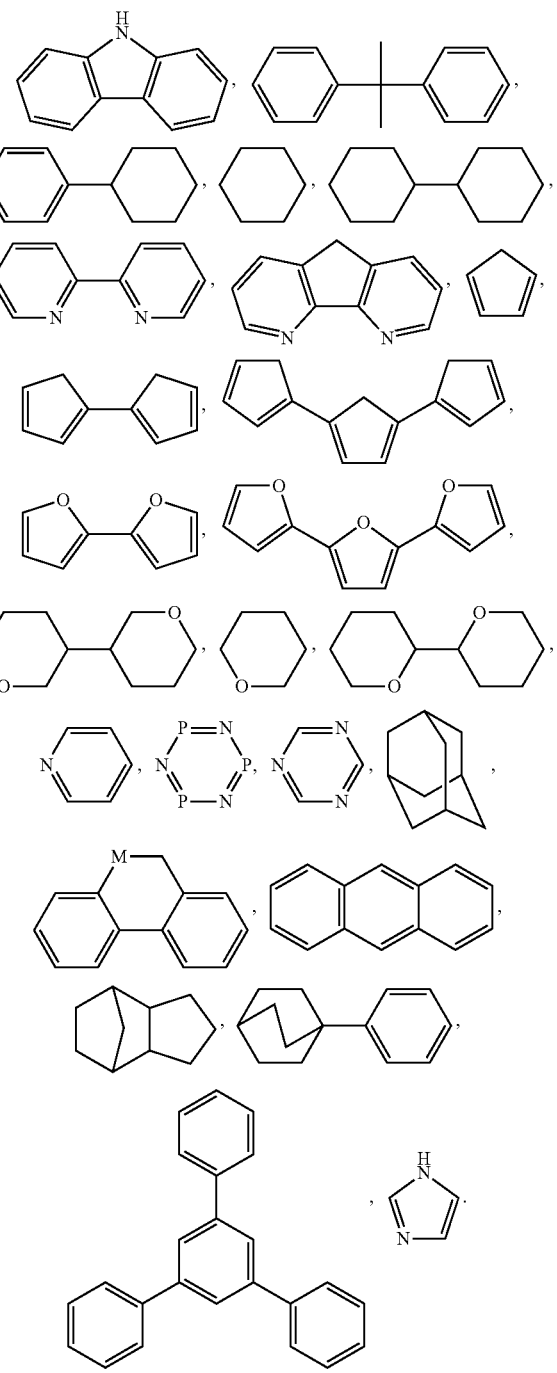

As described above, the first polymer layer and the second polymer layer may include an alignment polymer which is not polyimide, and the alignment polymer may be formed from a polymerizable compound including two or more vertical alignment groups and at least one anchoring group connected with a central group. The vertical alignment group may include a chain structure with a reactive end group. The anchoring group may hydrogen bond the alignment polymer to the first substrate or the second substrate.

In an exemplary embodiment of the present invention, the polymerizable compound of the alignment polymer may be represented by Chemical Formula 1A:

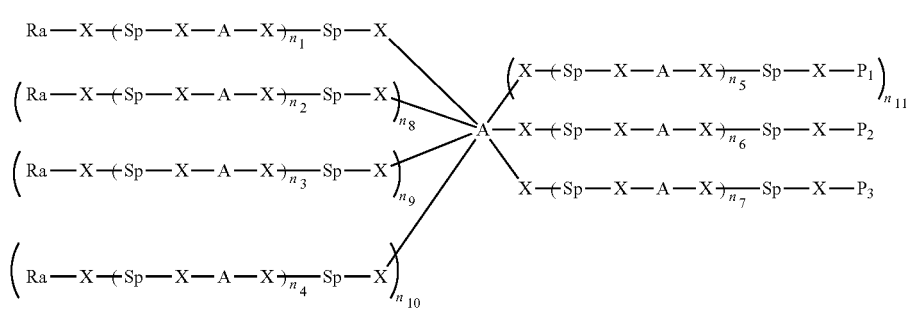

[Chemical Formula 1A]

In Chemical Formula 1A, all the structure labels such as "Ra", "X", "Sp", "A", "$P_1$", "$P_2$", and "$P_3$" are as defined in Chemical Formula 1, except no $n_{12}$. Here, "$n_1$" to "$n_{11}$" are independently an integer that is in a range of 0 to 1.

The compound represented by Chemical Formula 1 may be selected from one or more of Chemical Formulae 1-1 to 1-14.

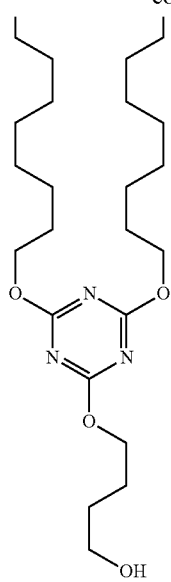

-continued

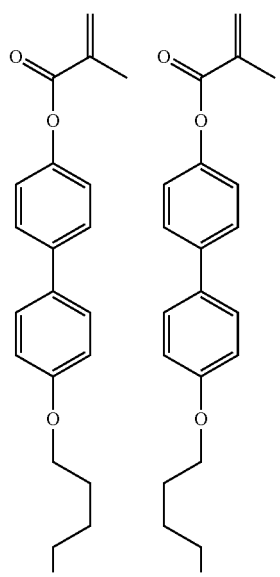

[Chemical Formula 1-1]

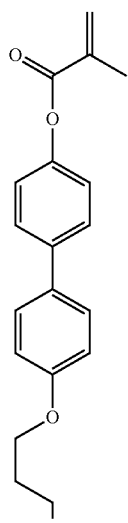

[Chemical Formula 1-2]

-continued
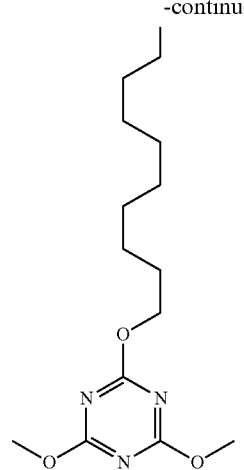
[Chemical Formula 1-3]
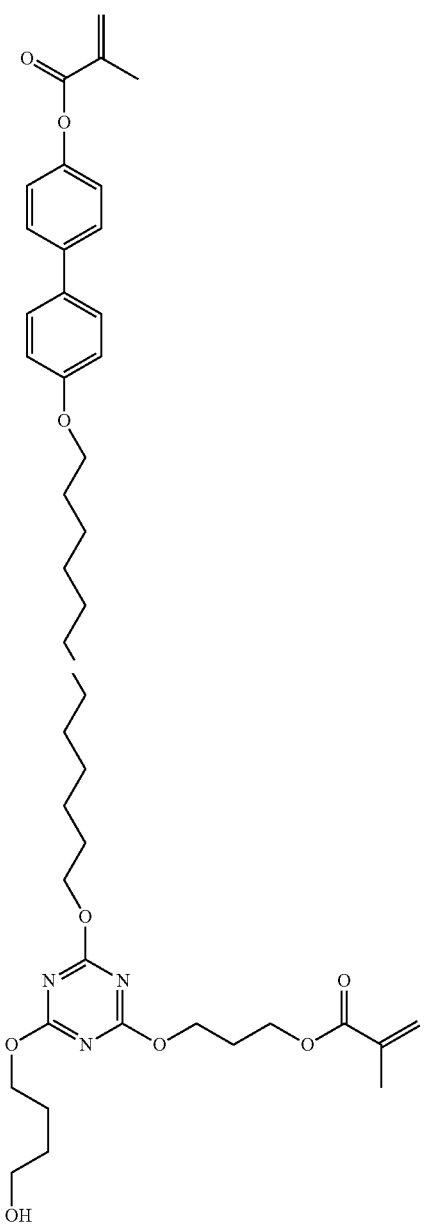
[Chemical Formula 1-4]
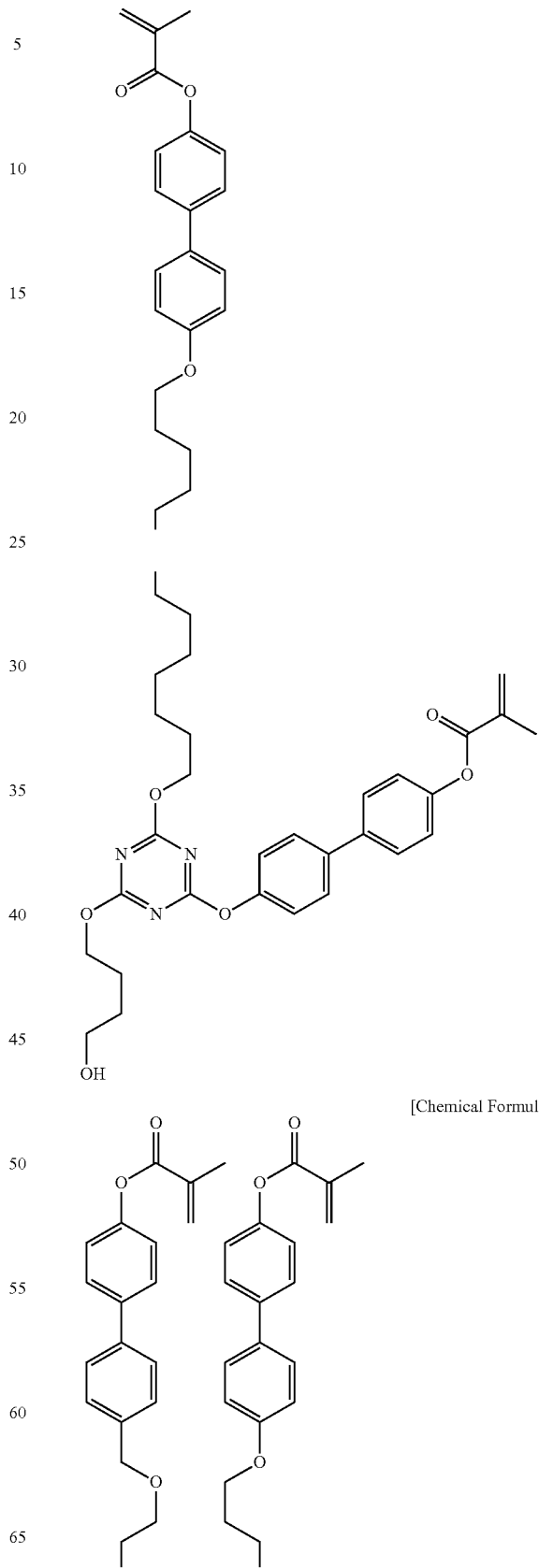
[Chemical Formula 1-5]

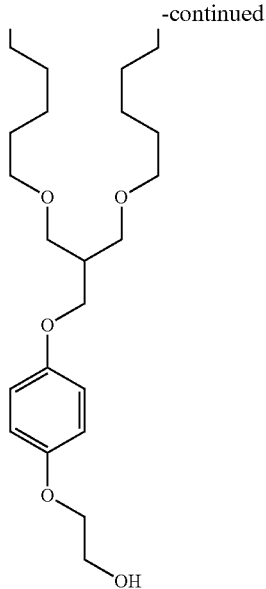
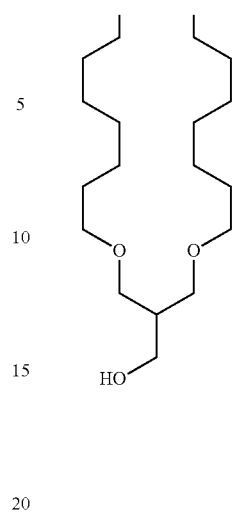
[Chemical Formula 1-6]
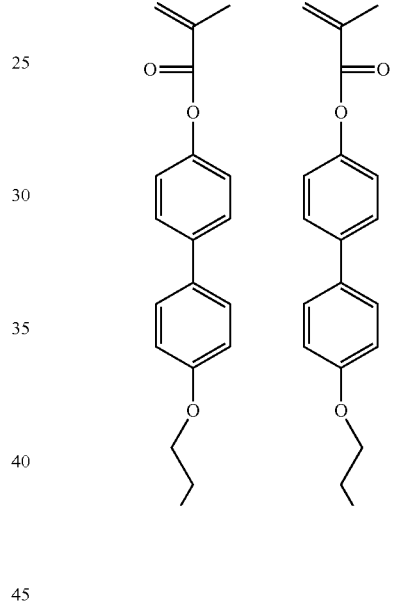
[Chemical Formula 1-7]
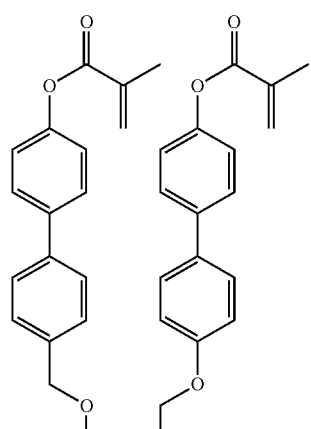
[Chemical Formula 1-8]
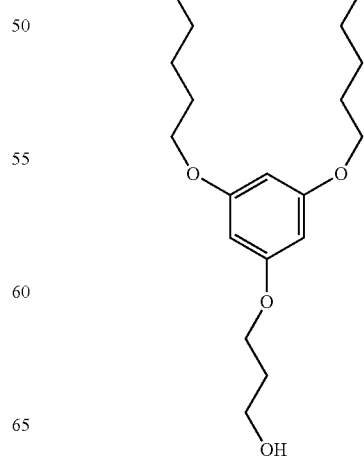

[Chemical Formula 1-9]
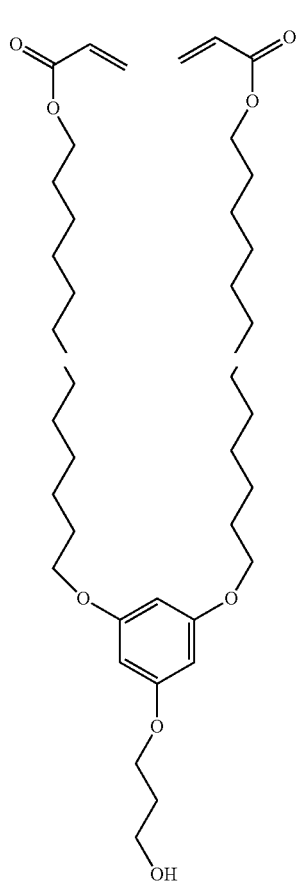
[Chemical Formula 10]
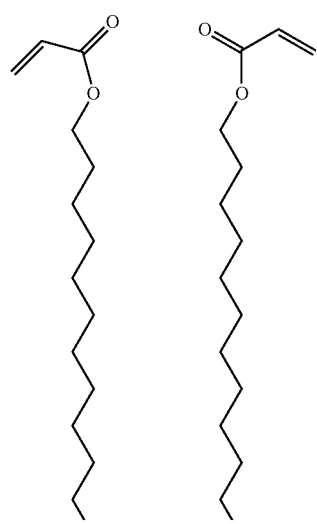 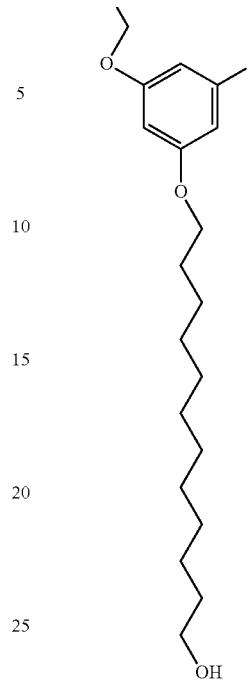
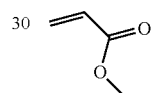
[Chemical Formula 1-11]
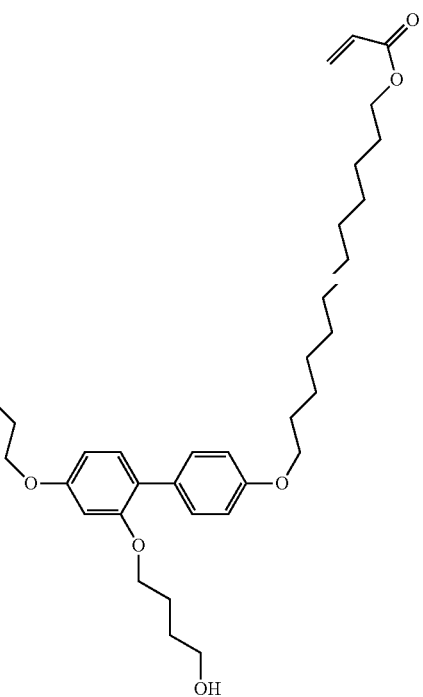
[Chemical Formula 1-12]
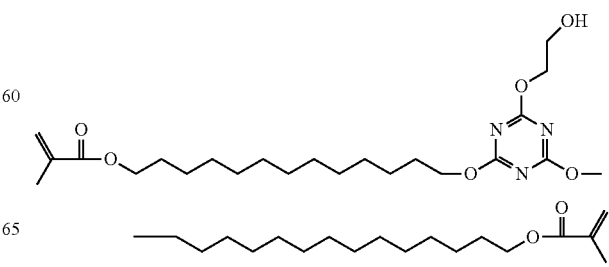

[Chemical Formula 1-13]

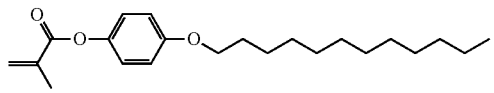

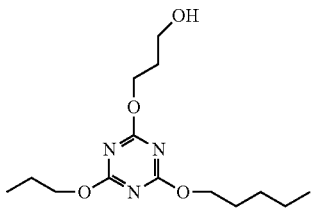

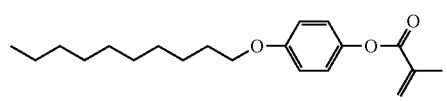

[Chemical Formula 1-14]

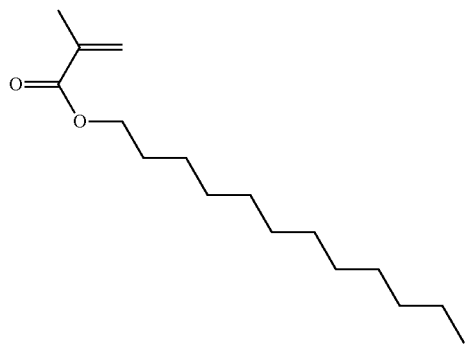

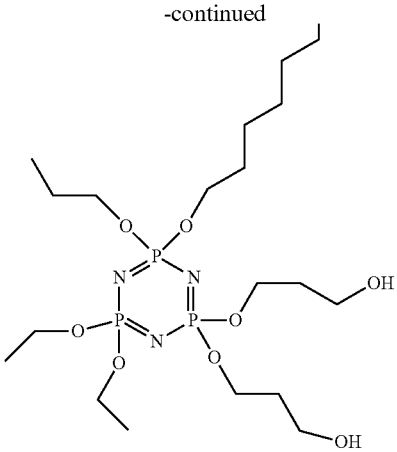

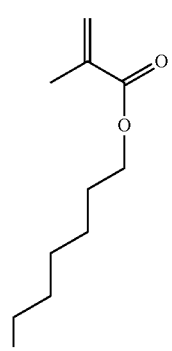

All of the compounds represented by Chemical Formulae 1-1 to 1-14 except Chemical Formula 1-2 include two or more vertical alignment groups and at least one anchoring group that can be bonded to the substrate.

In the compounds represented by Chemical Formulae 1-1 to 1-14, the anchoring group is hydrogen-bonded to the first or second substrate, and the reactive group positioned at the end of the vertical alignment group polymerizes with an adjacent reactive group to form a polymer layer.

As will be described later in detail, since the first electrode is disposed between the first substrate and the liquid crystal layer and the second electrode is disposed between the second substrate and the liquid crystal layer, the anchoring groups of the compounds represented by Chemical Formulae 1-1 to 1-14 may be hydrogen-bonded to the first electrode of the first substrate and hydrogen-bonded to the second electrode of the second substrate. The compounds represented by Chemical Formulae 1-1 to 1-14 may then polymerized and hydrogen-bonded to the first electrode and the second electrode. Since, the first polymer layer is disposed between the first substrate and the liquid crystal layer, and the second polymer layer is disposed between the second substrate and the liquid crystal layer, the first polymer layer and the second polymer layer are respectively hydrogen-bonded to the first electrode and the second electrode.

Referring to FIG. 1, the protrusions 13 are disposed between the first polymer layer 15 and the liquid crystal layer 3 and between the second polymer layer 25 and the liquid crystal layer 3.

The protrusions 13 include an oriented polymer in which reactive mesogens are polymerized. In other words, the photoreactive groups positioned at the end of the reactive mesogens polymerize with the photoreactive groups of the reactive mesogens that are adjacent thereto to form oriented polymers, which constitute protrusions.

The reactive mesogens may be selected from one or more of Chemical Formulae 2-1 to 2-14.

[Chemical Formula 2-1]
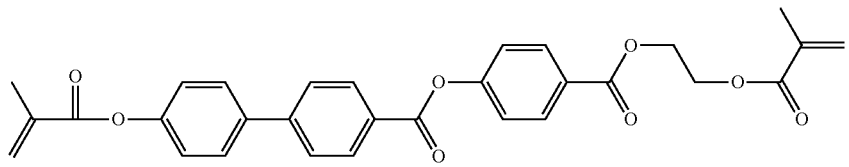
[Chemical Formula 2-2]
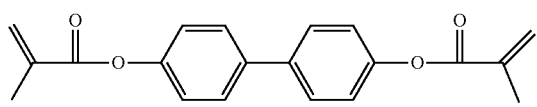
[Chemical Formula 2-3]
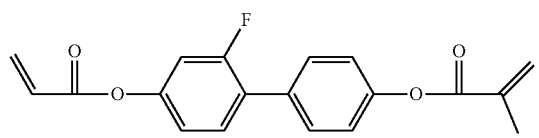
[Chemical Formula 2-4]
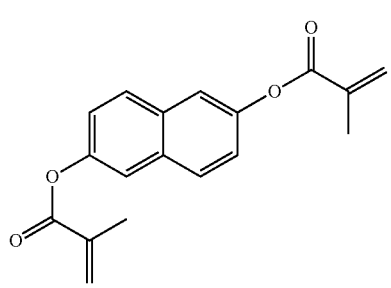
[Chemical Formula 2-5]
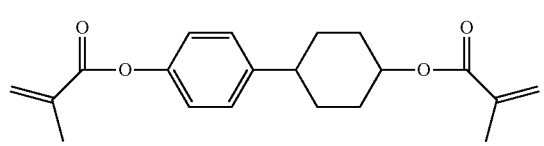
[Chemical Formula 2-6]
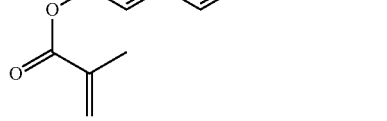
[Chemical Formula 2-7]
[Chemical Formula 2-8]
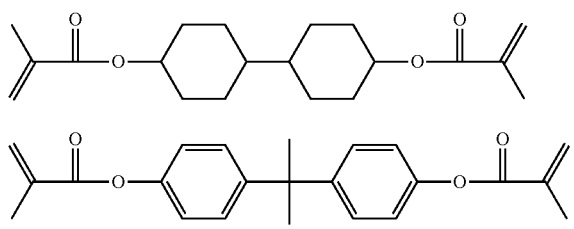
[Chemical Formula 2-9]
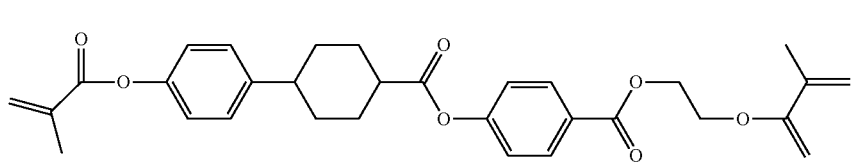
[Chemical Formula 2-10]
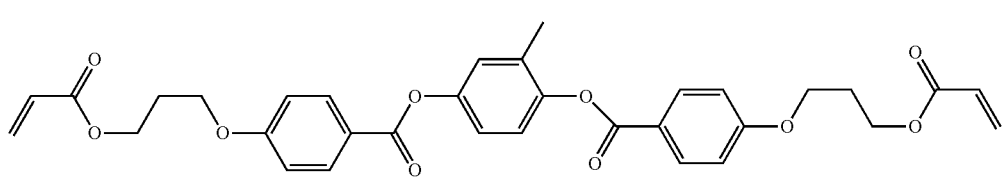
[Chemical Formula 2-11]
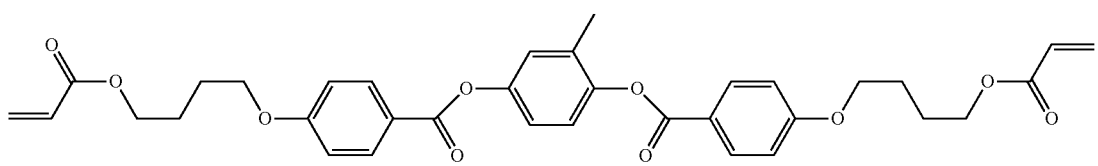
[Chemical Formula 2-12]
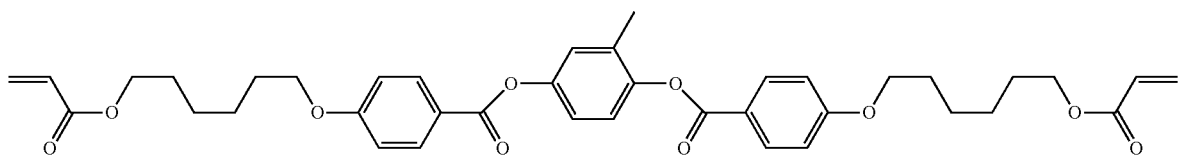

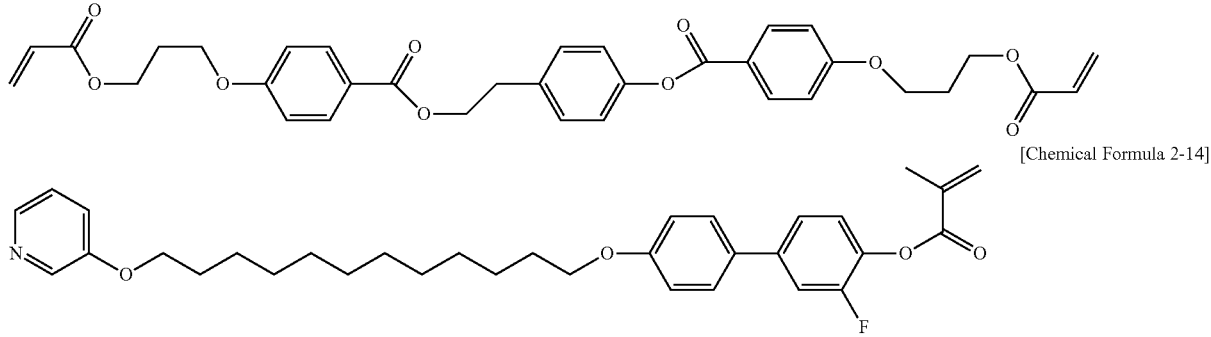

[Chemical Formula 2-13]

[Chemical Formula 2-14]

Herein, "$X_2$" is selected from one of H, $CH_3$, $(CH_2)_nCH_3$, F, Br, I, OH, $C_3H_7$, $NH_2$, and CN, and n is an integer that is in a range of 1 to 20.

By the action of such protrusions 13, liquid crystal molecules 31 may have a pretilt. In other words, when the reactive mesogens polymerize with each other to form the protrusions 13, the pretilt is formed in the adjacent liquid crystal molecules 31. Thus, the liquid crystal molecules 31 adjacent to the protrusions 13 can be tilted with respect to a direction perpendicular to the first substrate 110 even in a state in which no voltage is applied when the protrusions 13 are formed. In the entire specification, 'pretilt' indicates that the liquid crystal molecules 310 are tilted with respect to a direction perpendicular to a surface of the first substrate 110 or the second substrate 210, and 'pretilt angle' indicates a degree to which the liquid crystal molecules are tilted in the direction perpendicular to the first substrate 110 or the second substrate 210, that is, a tilted angle of the liquid crystal molecules from the substrate surface.

As such, when liquid crystal molecules 31 have a pretilt, the liquid crystal molecules 31 can be rotated rapidly by the pretilt formed in the liquid crystal molecules 31 when a voltage is applied thereafter, and the response speed is increased.

As described above, the liquid crystal display may include: the first polymer layer 15 and the second polymer layer 25, in which the compounds represented by Chemical Formula 1 are photopolymerized instead of the alignment layer including polyimide; and the protrusions 13 disposed between the first polymer layer 15 and the liquid crystal layer 3 and between the second polymer layer 25 and the liquid crystal layer 3, in order to ameliorate surface afterimage. In addition, since the compounds represented by Chemical Formula 1 may include two or more vertical alignment groups, a content thereof can be reduced as compared with the liquid crystal display including one vertical alignment group.

Hereinabove, the core of the present invention has been described based on the first polymer layer 15 and the second polymer layer 25. Hereinafter, a structure of the liquid crystal display to which the first polymer layer 15 and the second polymer layer 25 are actually applied will be described in more detail.

The structure of the liquid crystal display device described in the present exemplary embodiment is merely an example, and the present invention is not limited to the following pixel structure. For example, the first polymer layer and the second polymer layer including the polymer of the compound represented by Chemical Formula 1 may be applied to any device having a structure in which a first electrode is disposed on a first substrate and a second electrode is disposed on a second substrate, without any limitation.

Hereinafter, a liquid crystal display according to an exemplary embodiment of the present invention will be described.

Figure 2:
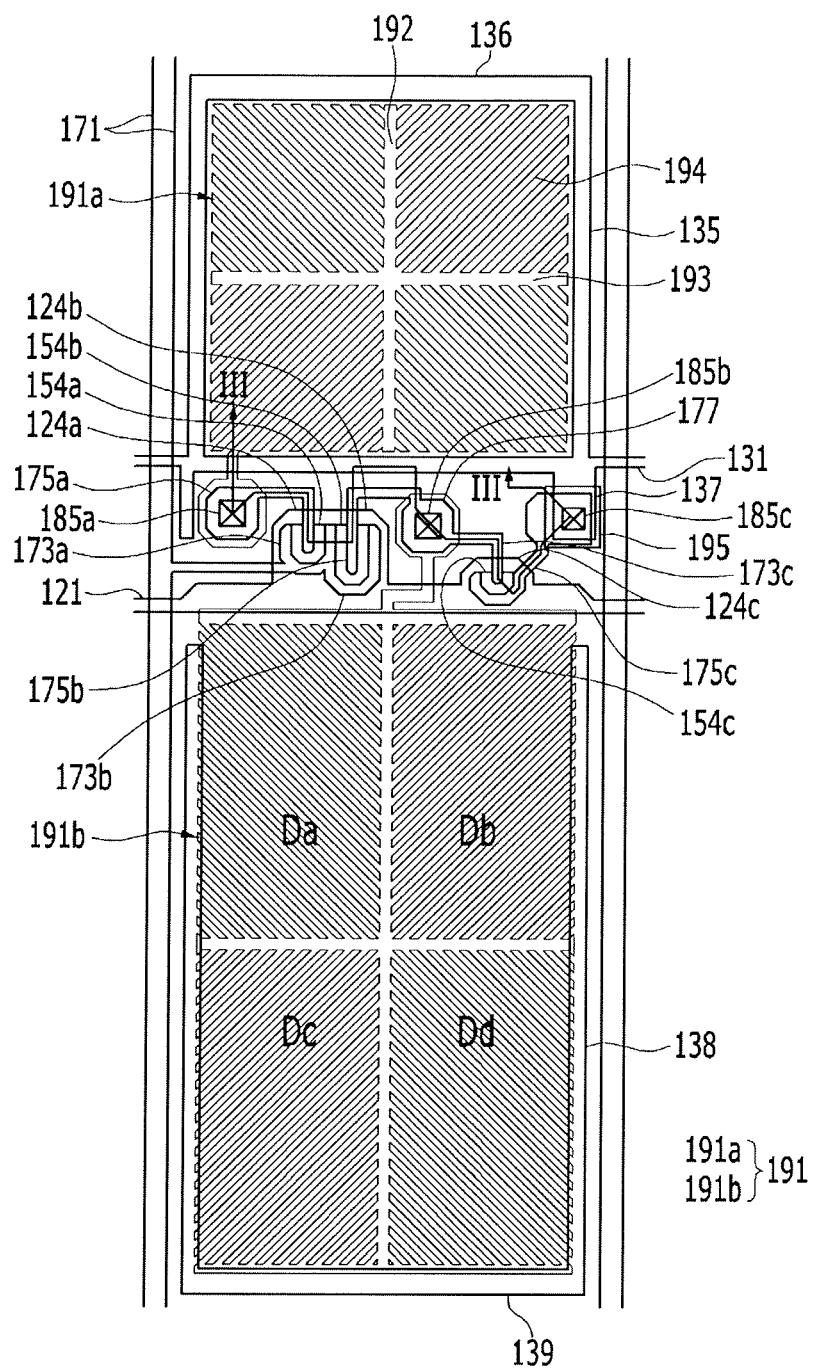
FIG. 2 is a plan layout view illustrating a pixel of a liquid crystal display according to an exemplary embodiment of the present invention.
Figure 3:
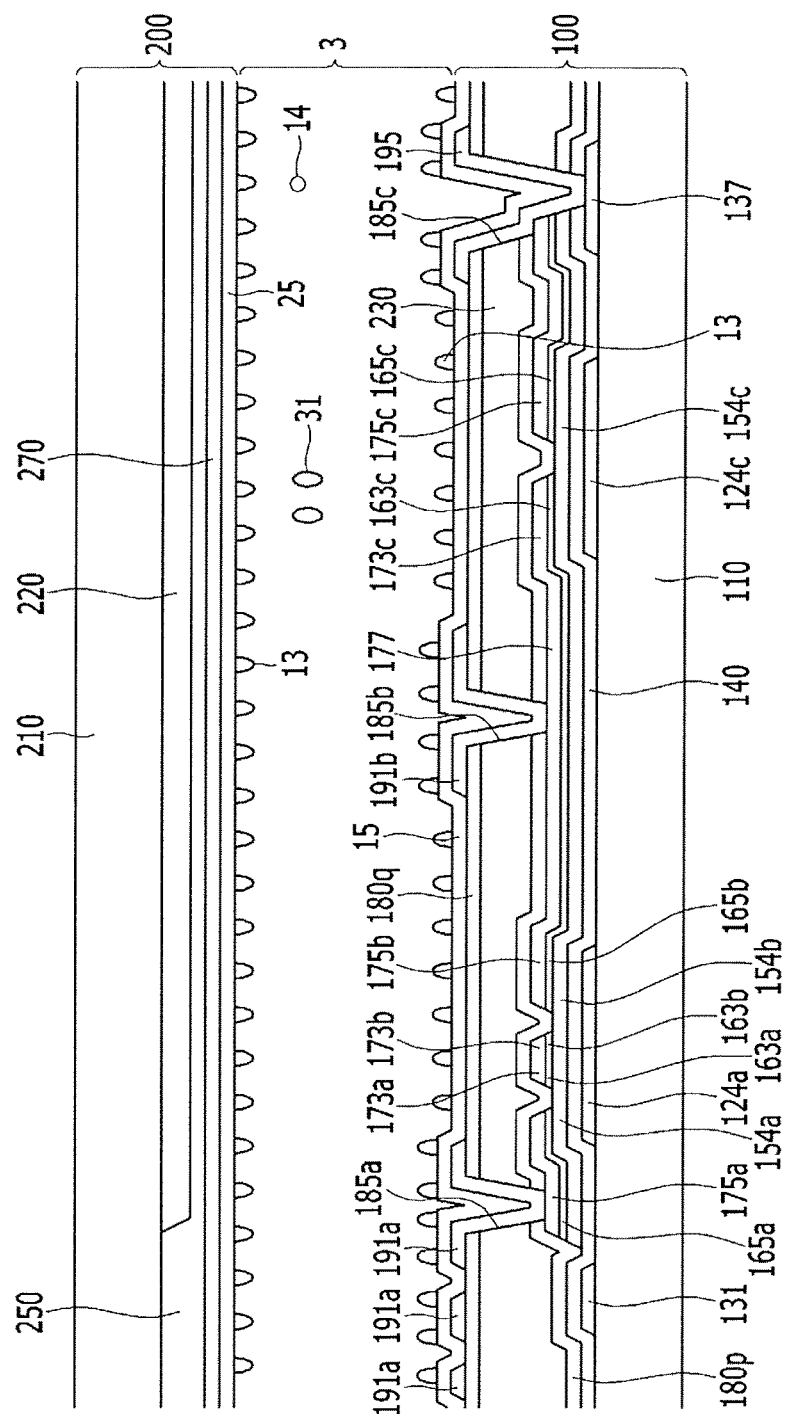
FIG. 3 is a cross-sectional view taken along line III-III of FIG. 2.

FIG. 2 is a plan layout view illustrating a pixel of a liquid crystal display according to an exemplary embodiment of the present invention, and FIG. 3 is a cross-sectional view taken along line III-III of FIG. 2.

First, the first display panel 100 will be described.

Gate conductors including a gate line 121 and a divided reference voltage line 131 are disposed on the first substrate 110 formed of, e.g., transparent glass or plastic.

The gate line 121 includes a first gate electrode 124a, a second gate electrode 124b, and a third gate electrode 124c.

The divided reference voltage line 131 includes first storage electrodes 135 and 136 and a reference electrode 137. Although not connected with the divided reference voltage line 131, second storage electrodes 138 and 139 may be disposed to overlap a second subpixel electrode 191b.

A gate insulating layer 140 is disposed on the gate line 121 and the divided reference voltage line 131.

A first semiconductor layer 154a, a second semiconductor layer 154b, and a third semiconductor layer 154c are disposed on the gate insulating layer 140. Ohmic contacts 163a, 165a, 163b, 165b, 163c, and 165c are disposed on the semiconductor layers 154a, 154b, and 154c.

Data conductors including a first drain electrode 175a, a second drain electrode 175b, a third source electrode 173c, a third drain electrode 175c, and a data line 171 connected with a first source electrode 173a and a second source electrode 173b are disposed on the ohmic contacts 163a, 165a, 163b, 165b, 163c, and 165c and the gate insulating layer 140.

The first gate electrode 124a, the first source electrode 173a, and the first drain electrode 175a together with the first semiconductor layer 154a constitute a first thin film transistor, the second gate electrode 124b, the second source electrode 173b, and the second drain electrode 175b together with the second semiconductor layer 154b constitute a second thin film transistor, and the third gate electrode 124c, the third source electrode 173c, and the third drain electrode 175c together with the third semiconductor layer 154c constitute a third thin film transistor.

The second drain electrode 175b is connected to the third source electrode 173c, and includes an extension 177 which is widely extended.

A first passivation layer 180p is disposed on the data conductors 171, 173c, 175a, 175b, and 175c and the semiconductor layers 154a, 154b, and 154c.

A color filter 230 is disposed on the first passivation layer 180p. The color filter 230 is extended in a vertical direction along two data lines 171 adjacent to each other. In the present exemplary embodiment, the color filter 230 has been described and illustrated to be included in the first display panel 100, but the present invention is not limited thereto. For example, the color filter 230 may be included in the second display panel 200.

A second passivation layer 180q is disposed on the color filter 230. The first passivation layer 180p and the second passivation layer 180q may include an inorganic insulating layer that is formed of a silicon nitride or a silicon oxide.

The second passivation layer 180q prevents the color filter 230 from being lifted, and suppresses contamination of the liquid crystal layer 3 due to an organic material such as a solvent flowing from the color filters 230, thereby preventing an abnormality such as a residual image occurrable when a screen is driven.

The first passivation layer 180p and the second passivation layer 180q respectively have a first contact hole 185a and a second contact hole 185b formed to overlap the first drain electrode 175a and the second drain electrode 175b.

The first passivation layer 180p, the second passivation layer 180q, and the gate insulating layer 140 have a third contact hole 185c formed to overlap a part of the reference electrode 137 and a part of the third drain electrode 175c, and the third contact hole 185c is covered with a connecting member 195. The connecting member 195 serves to electrically connect the third drain electrode 175c with the reference electrode 137 which is overlapped with the third contact hole 185c.

A pixel electrode 191 is disposed on the second passivation layer 180q. The pixel electrode 191 serves as one of field generating electrodes. Each pixel electrode 191 includes a first subpixel electrode 191a and a second subpixel electrode 191b which are separated from each other with the gate line 121 interposed therebetween, and are adjacent in a column direction based on the gate line 121.

The pixel electrode 191 may include a transparent material such as, for example, indium tin oxide (ITO) or indium zinc oxide (IZO).

An overall shape of the first sub-pixel electrode 191a and the second sub-pixel electrode 191.b is a rectangle, and includes a cross-shaped stem portion including a transverse stem portion 193 and a vertical stem portion 192 orthogonal thereto. In addition, each of the first subpixel electrode 191a and the second subpixel electrode 191b is divided into a first subarea Da, a second subarea Db, a third subarea Dc, and a fourth subarea Dd by the horizontal stem 193 and the vertical stem 192, and includes a plurality of minute branches 194 in each of the subareas Da-Dd.

The first subpixel electrode 191a and the second subpixel electrode 191b are physically and electrically connected to the first drain electrode 175a and the second drain electrode 175b, respectively, and receive the data voltage from the first drain electrode 175a and the second drain electrode 175b, respectively. In this case, some of the data voltage applied to the second drain electrode 175b is divided through the third source electrode 173c, so that a size of the voltage applied to the first subpixel electrode 191a may be larger than that of the voltage applied to the second subpixel electrode 191b.

The first subpixel electrode 191a and the second sub-pixel electrode 191b, to which the data voltage is applied, together with a common electrode 270 of the second display panel 200 generate an electric field to determine an orientation of the liquid crystal molecules 31 of the liquid crystal layer 3 disposed between the two electrodes 191 and 270. The luminance of the light passing through the liquid crystal layer 3 varies depending on the thus-determined orientation of the liquid crystal molecules 31.

The description of the above-described thin film transistor and the pixel electrode 191 is only one example, and the structure of the thin film transistor and the design of the pixel electrode may be changed to enhance lateral visibility.

The first polymer layer 15 is disposed between the pixel electrode 191 and the liquid crystal layer 3, and the first polymer layer 15 is the same as described with reference to FIG. 1. In other words, the first polymer layer 15 includes a polymer of the compound represented by Chemical Formula 1. The description related to the compound represented by Chemical Formula 1 is the same as described above, and a detailed description of the same constituent elements is omitted.

Protrusions 13 are disposed between the first polymer layer 15 and the liquid crystal layer 3. The protrusions 13 are the same as the protrusions 13 described with reference to FIG. 1. In other words, the protrusions 13 are polymers in which reactive mesogens are polymerized, and a detailed description of the same constituent elements is omitted.

Next, the second display panel 200 will be described.

The second substrate 210 is disposed to be separated from and overlap the first substrate 110. A light blocking member 220 is disposed between the second substrate 210 and the liquid crystal layer 3. The light blocking member 220 is disposed in the second display panel 200 to overlap an area where the data line 171 of the first display panel 100 is disposed and the area where the thin film transistor or the like is disposed. Although the present specification has been described and illustrated with respect to the exemplary embodiment in which the light blocking member 220 is included in the second display panel 200, the present invention is not limited thereto. For example, the light blocking member may be included in the first display panel 100.

An overcoat 250 is disposed between the light blocking member 220 and the liquid crystal layer 3. In an exemplary embodiment of the present invention, the overcoat 250 is omitted.

The common electrode 270 serving as one of the field generating electrodes is disposed between the overcoat 250 and the liquid crystal layer 3. The common electrode 270 together with the pixel electrode 191 of the first display panel 100 generates an electric field to determine an orientation of the liquid crystal molecules 31 of the liquid crystal layer 3.

The second polymer layer 25 is disposed between the common electrode 270 and the liquid crystal layer 3, and the second polymer layer 25 is the same as described with reference to FIG. 1. In other words, the second polymer layer 25 includes a polymer of the compound represented by Chemical Formula 1. The description related to the compound represented by Chemical Formula 1 is the same as described above, and a detailed description of the same constituent elements is omitted.

Protrusions 13 are disposed between the second polymer layer 25 and the liquid crystal layer 3. The protrusions 13 are the same as the protrusions 13 described with reference to FIG. 1. In other words, the protrusions 13 are polymers in which reactive mesogens are polymerized, and detailed description of the same constituent elements is omitted.

The liquid crystal layer 3 includes liquid crystal molecules 31. In this case, the liquid crystal layer 3 further includes the compound represented by Chemical Formula 1, which is in an unreacted state, and reactive mesogens 14. When the compound represented by Chemical Formula 1 and the reactive mesogens are included in the liquid crystal layer to react with each other, thereby forming polymer layers and protrusions, respectively, in the manufacturing method of the liquid crystal display according to the present exemplary embodiment, some of the compound represented by Chemical Formula 1 and the reactive mesogens may remain in the liquid crystal layer without reacting with each other.

Hereinafter, an effect of the liquid crystal display according to the exemplary embodiment will be described.

Figure 4:
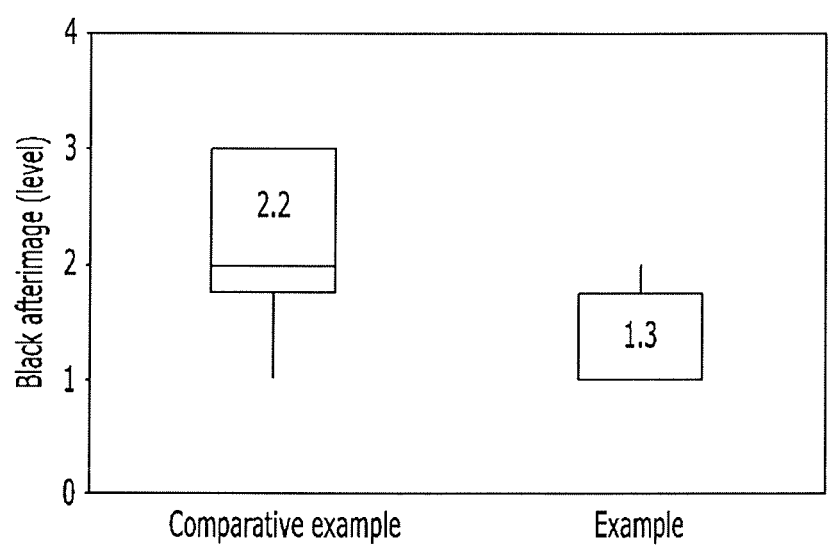
FIG. 4 is comparison of black afterimages of a liquid crystal display according to an example of the present invention and a comparative example.
Figure 5:
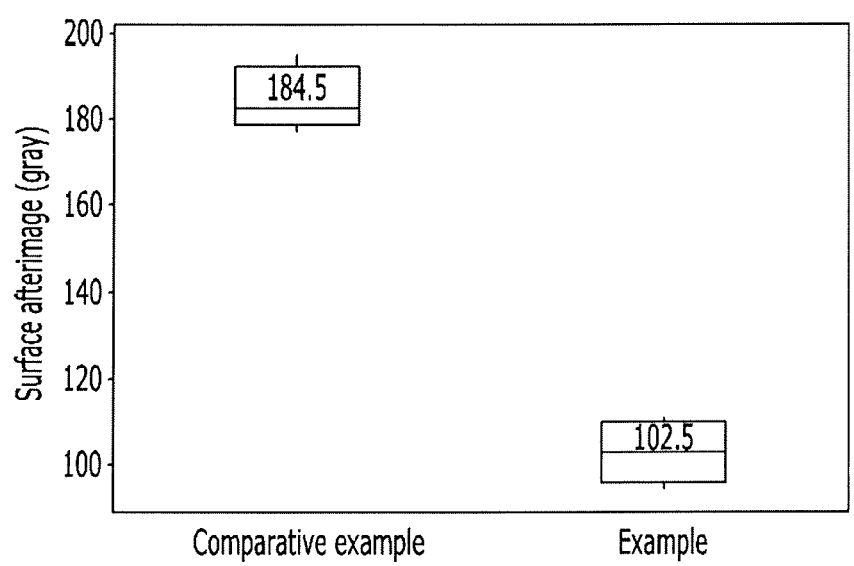
FIG. 5 is comparison of surface afterimages of a liquid crystal display according to an example of the present invention and a comparative example.

FIG. 4 is comparison of black afterimages of a liquid crystal display according to an example of the present invention and a comparative example, and FIG. 5 is comparison of surface afterimages of a liquid crystal display according to the example of the present invention and the comparative example.

In a liquid crystal display according to the example of FIG. 4 and FIG. 5, a polymer formed by photopolymerizing the compound represented by Chemical Formula 1-1 is included in a first polymer layer and a second polymer layer.

[Chemical Formula 1-1]

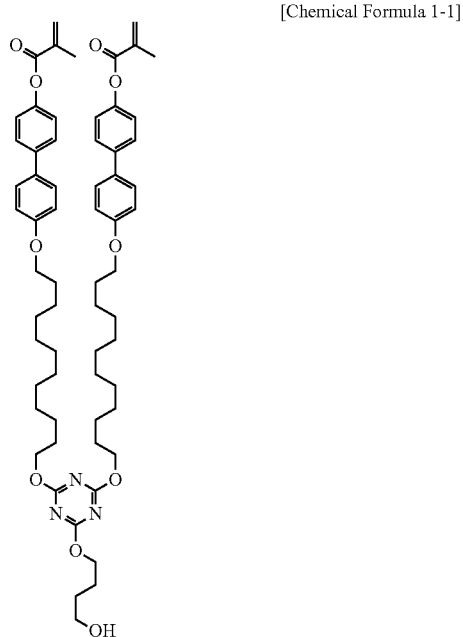 [SMILES: C=C(C)C(=O)Oc1ccc(-c2ccc(OCCCCCCCCCCCCOc3nc(OCCCCO)nc(OCCCCCCCCCCCCOc4ccc(-c5ccc(OC(=O)C(=C)C)cc5)cc4)n3)cc2)cc1]

In a liquid crystal display according to the comparative example of FIG. 4 and FIG. 5, a polymer formed by photopolymerizing the compound represented by Chemical Formula 3 is included in the first polymer layer and the second polymer layer.

Comparing the compound represented by Chemical Formula 1-1 with the compound represented by Chemical Formula 3, the compound represented by Chemical Formula 3 includes one vertical alignment group, while the compound represented by Chemical Formula 1-1 includes two vertical alignment groups. In addition, Chemical Formula 1-1 also includes a good anchoring group, —OH, that is a proton donor and can be hydrogen-bonded to the substrate, thus may also help alignment.

Referring to FIG. 4, a black afterimage level of 1.3 in the liquid crystal display according to the example of the present invention is significantly lower than the black afterimage level of 2.2 in the liquid crystal display according to the comparative example. The numerical value in FIG. 4 is obtained by displaying the black screen for a certain period of time, then turning off the power and digitizing the black afterimage to be displayed.

Referring to FIG. 5, a surface afterimage level of 102.5 in the liquid crystal display according to the example of the present invention is significantly lower than the surface afterimage level of 184.5 in the liquid crystal display according to the comparative example. The numerical values in FIG. 5 indicate a luminance in which a black screen and a white screen are not distinguished from each other while increasing the luminance by turning off the power after displaying the black screen and the white screen for a certain period of time. As the luminance is reduced, the afterimage characteristic is increased. As illustrated in FIG. 5, the afterimage characteristic of the liquid crystal display according to the example of the present invention was remarkably excellent.

Figure 6:
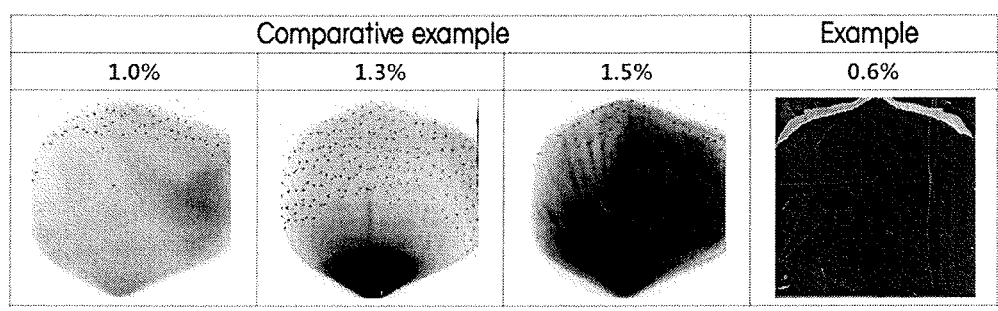
FIG. 6 shows alignment states of a liquid crystal display according to a content of a compound represented by Chemical Formula 3 (comparative example) and a liquid crystal display according to a content of a compound represented by Chemical Formula 1-1 (example) of the present invention.

FIG. 6 shows alignment states of a liquid crystal display according to a content of a compound represented by Chemical Formula 3 (comparative example) and a liquid crystal display according to a content of a compound represented by Chemical Formula 1-1 (example) of the present invention.

As shown in FIG. 6, in the liquid crystal display including the polymer of the compound represented by Chemical Formula 3 (comparative example), even when the content is 1.5 wt %, a complete alignment characteristic cannot be displayed, and stains and the like are seen. However, as shown in FIG. 6, in the liquid crystal display including the polymer of the compound represented by Chemical Formula 1-1 (example), even when the content is 0.6 wt %, a complete alignment characteristic can be displayed. Accordingly, the liquid crystal display according to the example of the present invention exhibits an excellent level of alignment characteristic even with a small amount of the polymer of the compound represented by Chemical Formula 1-1.

Hereinafter, a manufacturing method of a liquid crystal display according to an exemplary embodiment of the present invention will be described.

A manufacturing method of a liquid crystal display according to an exemplary embodiment of the present

[Chemical Formula 3]

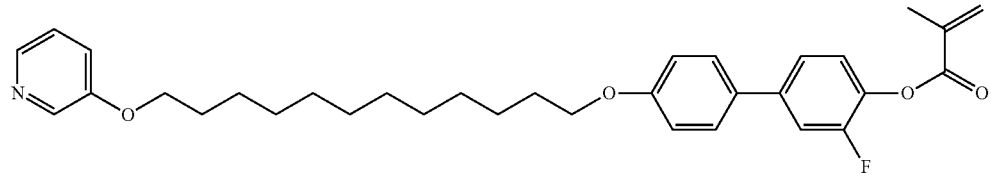

invention includes: preparing a first substrate and a second substrate which face each other; forming a liquid crystal layer between the first substrate and the second substrate to include a plurality of liquid crystal molecules, reactive mesogens, and a compound represented by Chemical Formula 1; and irradiating an ultraviolet (UV) light to the first substrate and the second substrate. The irradiation of the UV light to the first substrate and the second substrate may be carried out with an electric field applied to the system.

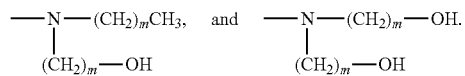

"m" is independently an integer that is in a range of 1 to 4.
"l" is independently an integer that is in a range of 1 to 4.

[Chemical Formula 1]

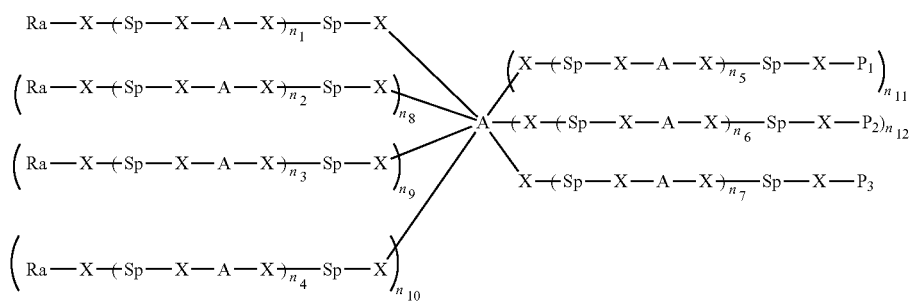

In Chemical Formula 1, "A" includes a compound which includes one or more of C, N, an aromatic ring, a heteroaromatic ring, an aliphatic ring, a heterocyclic ring, a condensed ring thereof, a tertiary amine, and two or more ring compounds linked to each other. "X" is independently selected from one of a single bond, —O—, —S—, —CO—, —CO—O—, —OCO—, —O—CO—O—, —OCH$_2$—, —SCH$_2$—, —CH$_2$S—, —CF$_2$O—, —OCF$_2$—, —CF$_2$S—, —SCF$_2$—, —(CH$_2$)$_l$—, —CF$_2$CH$_2$—, —CH$_2$CF$_2$—, —(CF$_2$)$_l$—, —CF=CF—, —C≡C—, —CH=CH—COO—, —OCO—CH=CH—, —R$^0$—, —CH(-Sp-P$_0$)—, —CH$_2$CH(-Sp-P$_0$)—, and —CH(-Sp-P$_0$)CH(-Sp-P$_0$)—. "Sp" is a spacer or a single bond. P$_0$, P$_1$, P$_2$, and P$_3$ are independently selected from one of

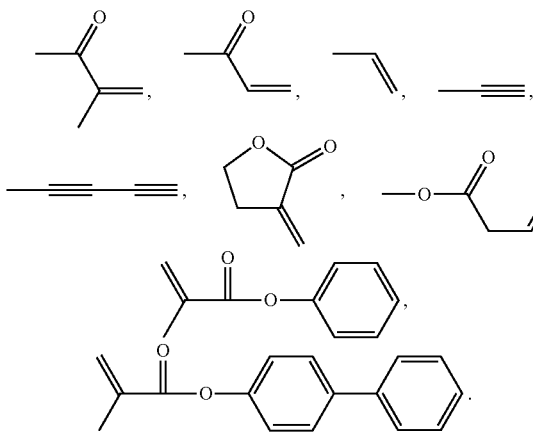

"Ra" is selected from one of —H, —F, —OH, —NH$_2$, —CN, —B(OH)$_2$, —SH, —Br, —I, a heteroaromatic ring, a heterocyclic ring, —OCH$_3$, —OCH$_2$CH$_3$, —OCH$_2$CH$_2$CH$_3$, —O—(CH$_2$—CH$_2$)$_m$—OCH$_3$, —NH(CH$_2$)$_m$CH$_3$, —N((CH$_2$)$_m$CH$_3$)$_2$, "$n_1$" to "$n_{12}$" are independently an integer that is in a range of 0 to 1, and preferably $n_{12}$ is 1. "R$^0$" is a C1-C12 alkyl group.

The spacer may be a divalent linking group connecting adjacent structures, and may be a C1 to C20 straight chain alkylene group. One CH$_2$ group or two or more non-adjacent CH$_2$ groups present in the above alkyl group may be independent from each other, and may be substituted by —O—, —S—, —NH—, —NCH$_3$—, —CO—, —COO—, —OCO—, —OCOO—, —SCO—, —COS—, —CH=CH—, or —C≡C—.

The compound A represented by Chemical Formula 1 may be selected from one of:

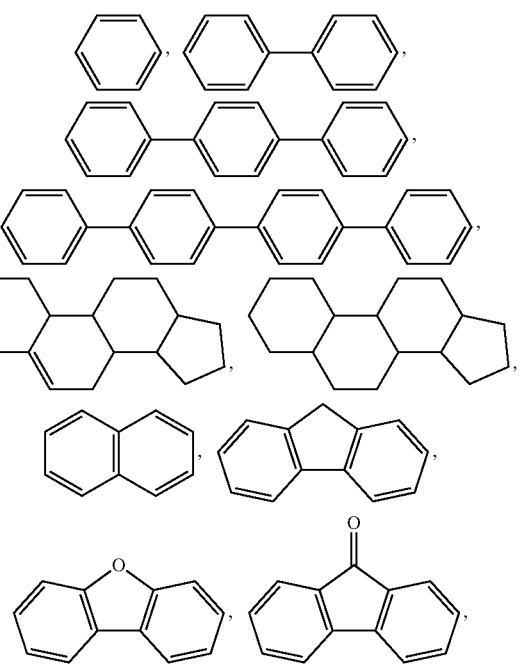

-continued
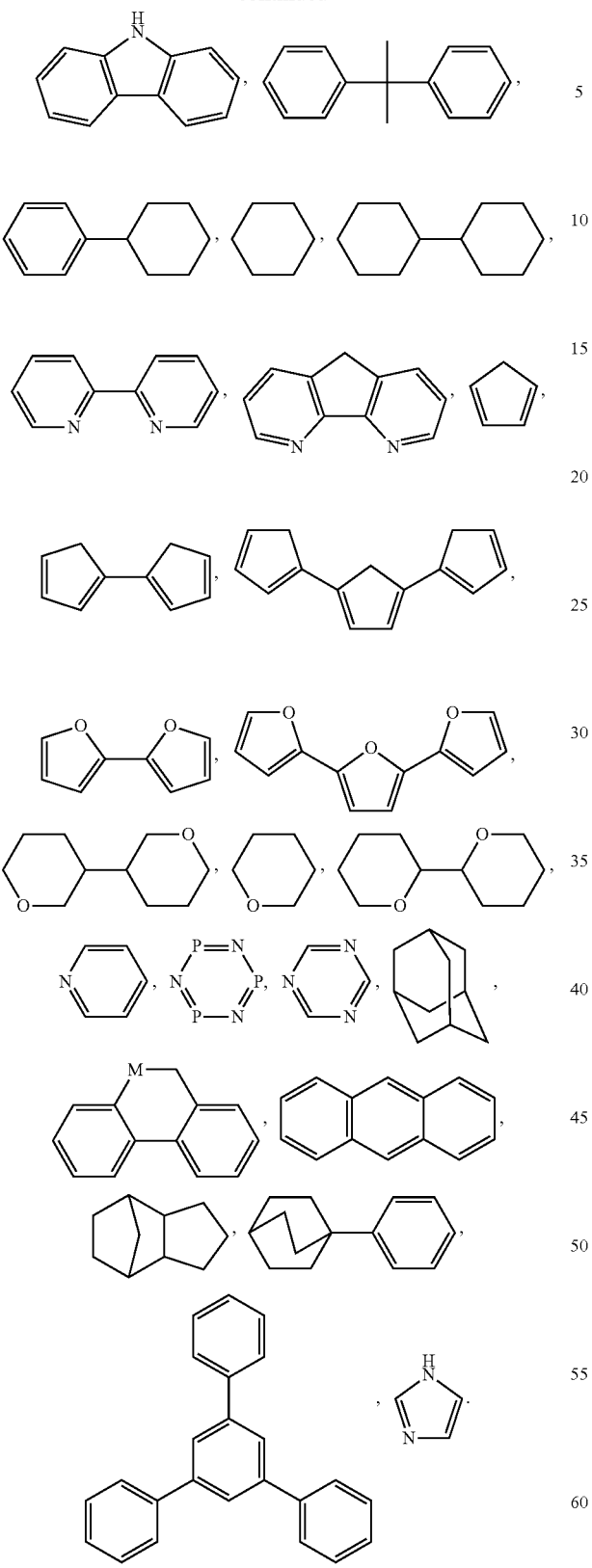
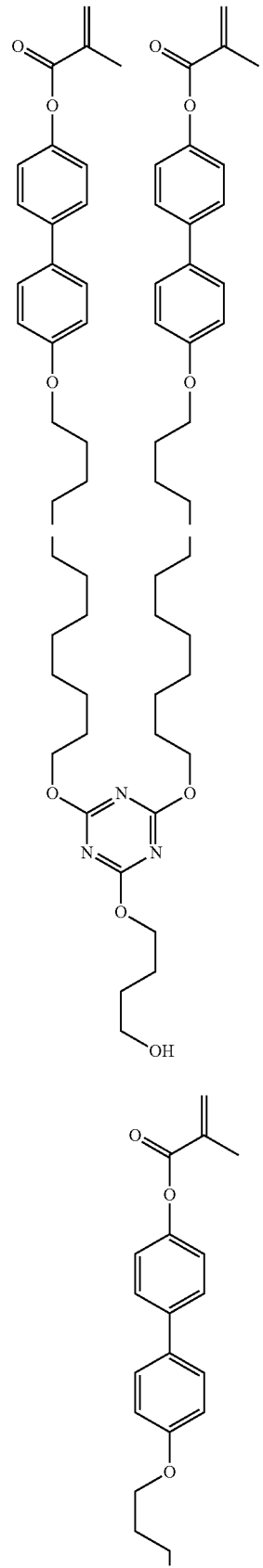
[Chemical Formula 1-1]
[Chemical Formula 1-2]
The compound represented by Chemical Formula 1 may be selected from one or more of Chemical Formulae 1-1 to 1-14.

-continued
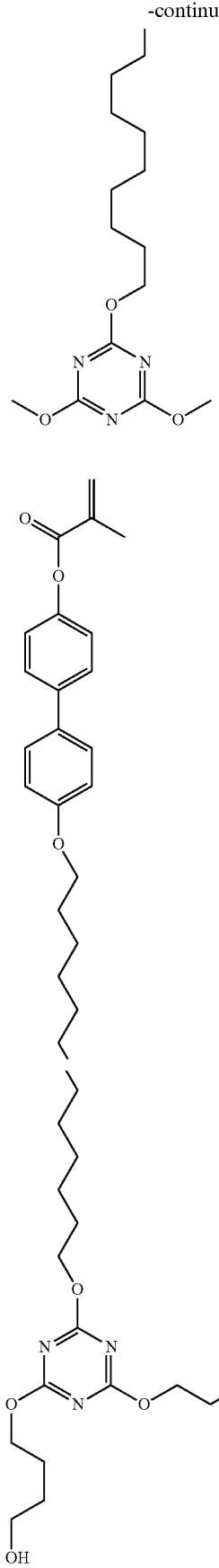
[Chemical Formula 1-3]
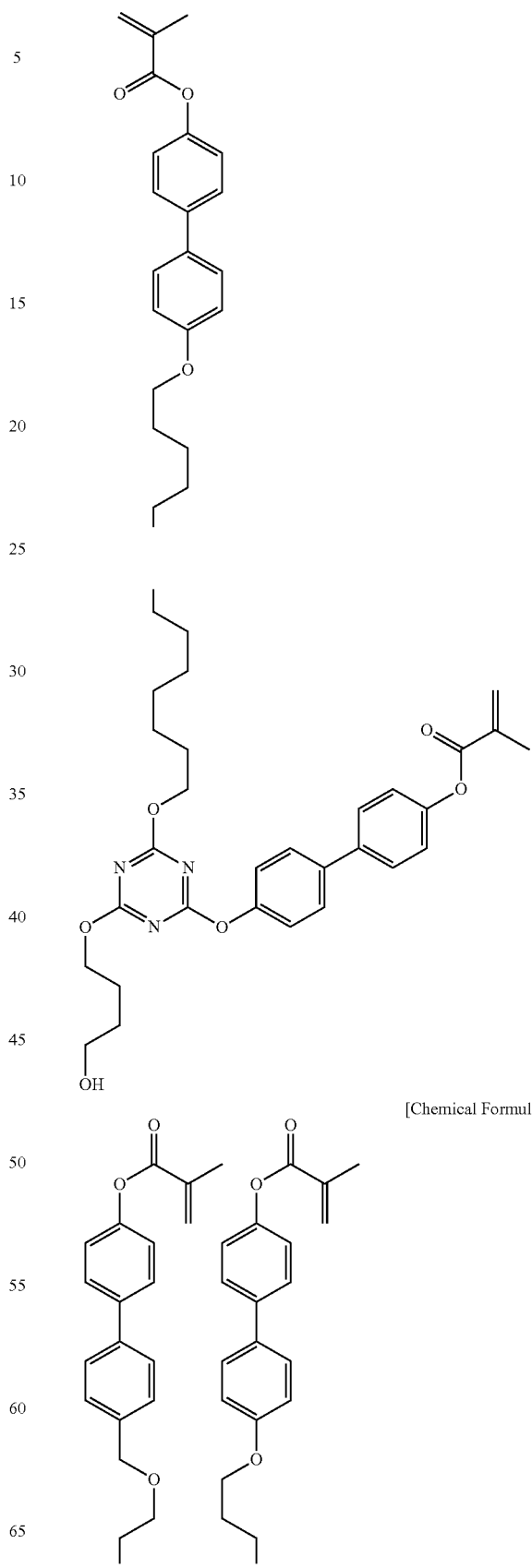
[Chemical Formula 1-4]
[Chemical Formula 1-5]

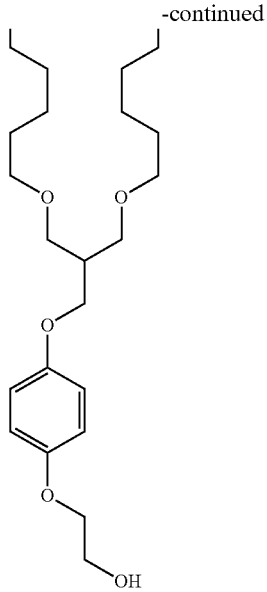
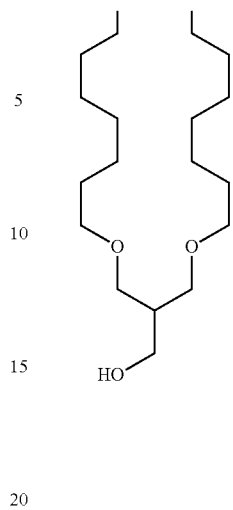
[Chemical Formula 1-6]
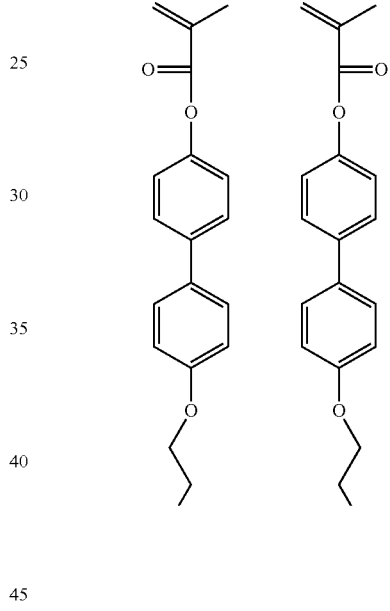
[Chemical Formula 1-7]
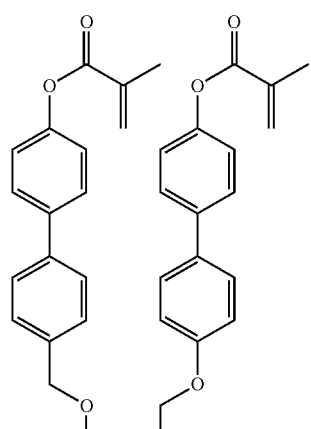
[Chemical Formula 1-8]
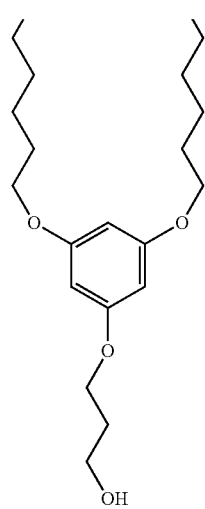

[Chemical Formula 1-9]
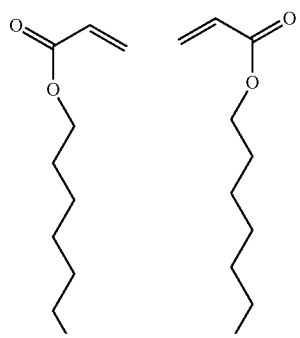
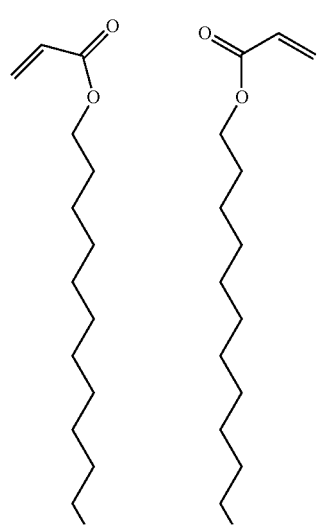
[Chemical Formula 10]
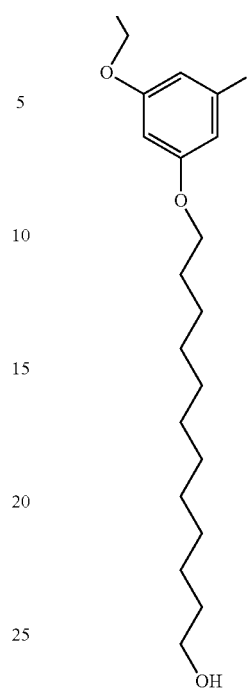
[Chemical Formula 1-11]
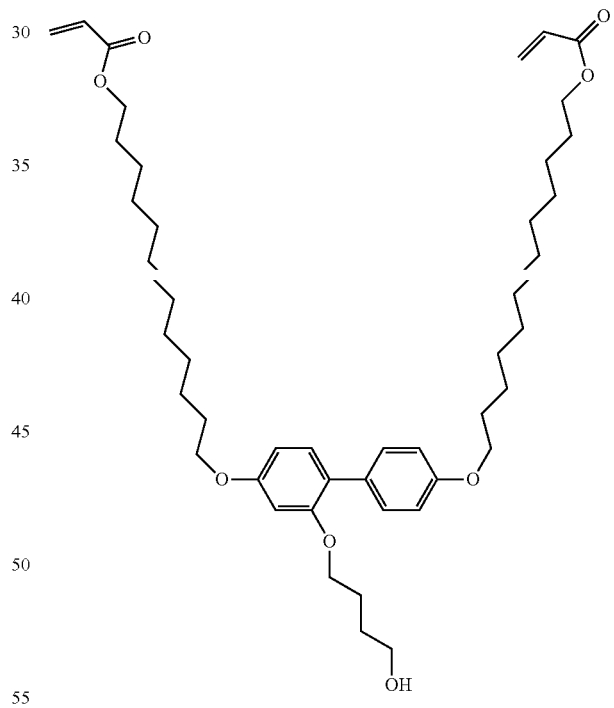
[Chemical Formula 1-12]
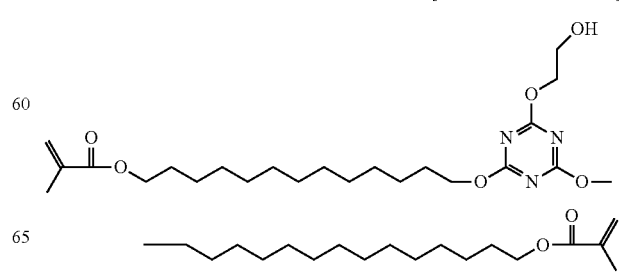

[Chemical Formula 1-13]
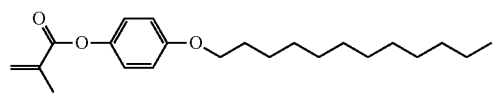
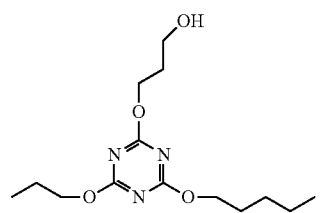
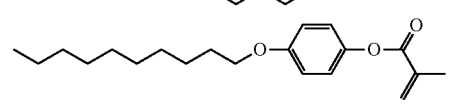
[Chemical Formula 1-14]
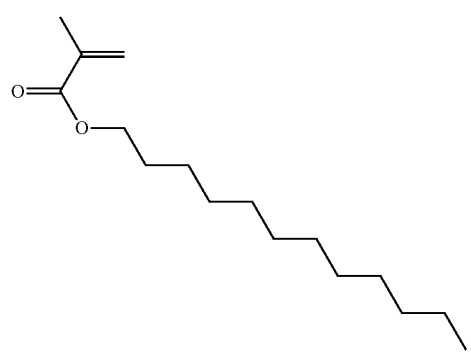
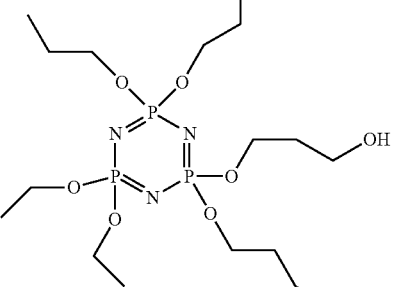
The reactive mesogens may be selected from one or more of Chemical Formulae 2-1 to 2-14.
[Chemical Formula 2-1]
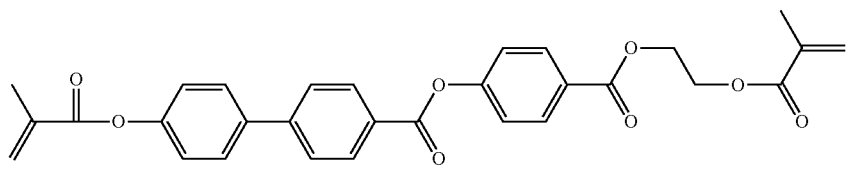
[Chemical Formula 2-2]
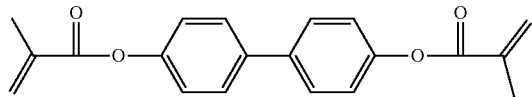
[Chemical Formula 2-3]
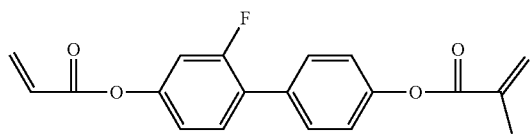
[Chemical Formula 2-4]
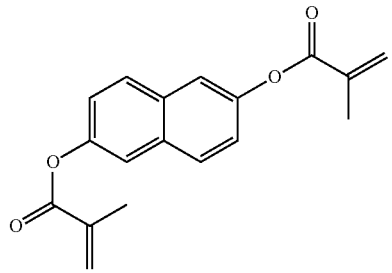

[Chemical Formula 2-5]
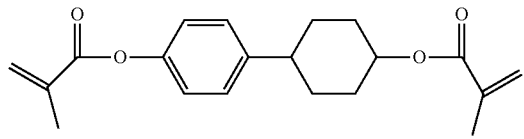
[Chemical Formula 2-6]
[Chemical Formula 2-7]
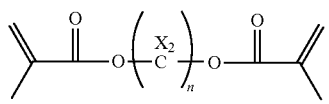
[Chemical Formula 2-8]
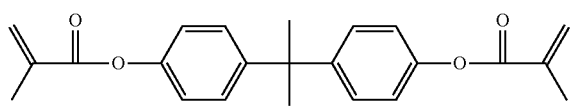
[Chemical Formula 2-9]
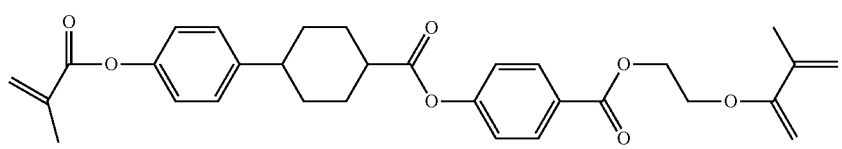
[Chemical Formula 2-10]
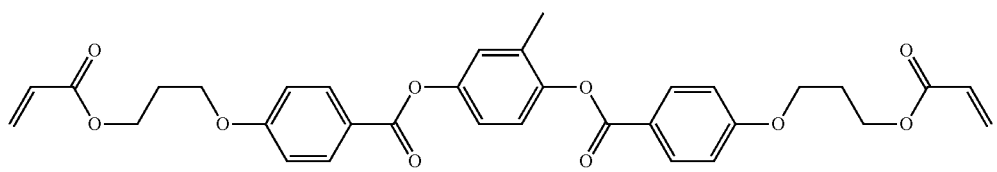
[Chemical Formula 2-11]
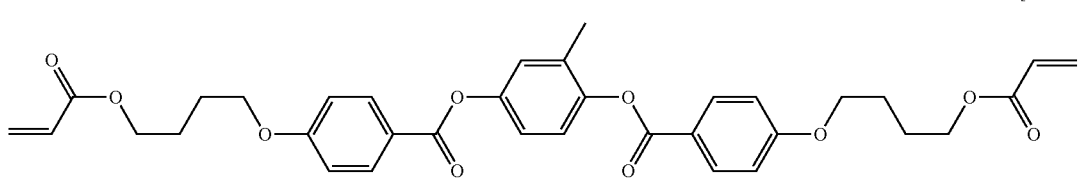
[Chemical Formula 2-12]
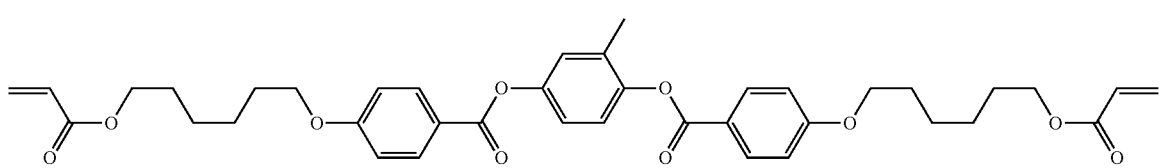
[Chemical Formula 2-13]
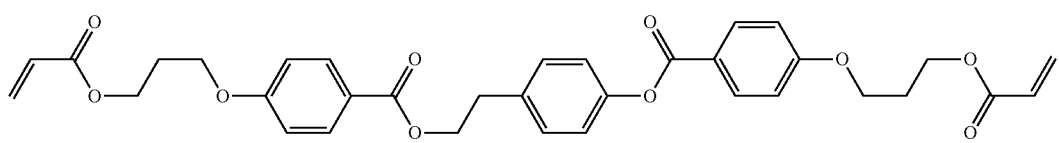
[Chemical Formula 2-14]
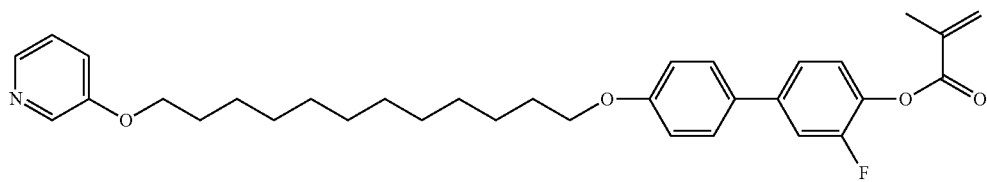

"$X_2$" is selected from one of H, $CH_3$, $(CH_2)_nCH_3$, F, Br, I, OH, $C_3H_7$, $NH_2$, and CN, and n is an integer that is in a range of 1 to 20.

Figure 7:
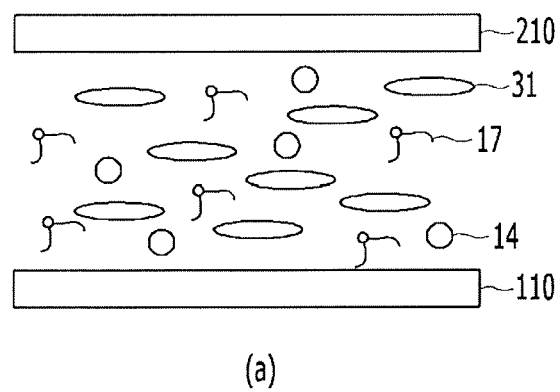
FIG. 7 shows stepwise views illustrating a manufacturing method of a liquid crystal display according to an exemplary embodiment of the present invention.
Figure 7:
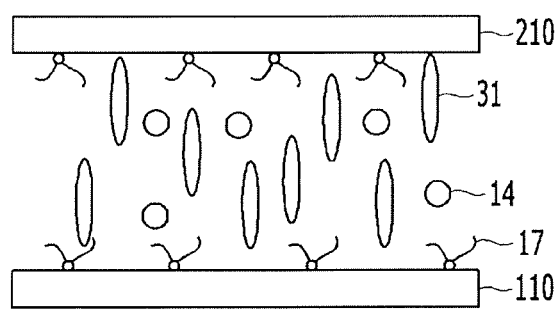
Figure 7:
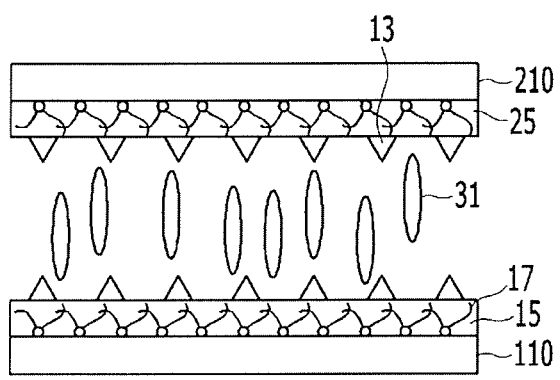

FIG. 7 shows stepwise views illustrating a manufacturing method of a liquid crystal display according to an exemplary embodiment of the present invention.

Referring to FIG. 7 (a), a liquid crystal composition including liquid crystal molecules 31, reactive mesogens 14, and a compound represented by Chemical Formula 1 is injected between the first substrate 110 and the second substrate 210.

In the liquid crystal composition, a content of compound 17 represented by Chemical Formula 1 may be in a range of about 0.1 wt % to about 2.0 wt % with respect to an entire liquid crystal composition.

The compound 17 represented by Chemical Formula 1 includes two vertical alignment groups and an anchoring group for being bonded to the substrate.

Next, referring to FIG. 7 (b), the anchoring group of the compound 17 represented by Chemical Formula 1 is bonded to the first substrate 110 and the second substrate 210 by the action of the injecting process. In this case, the binding may be hydrogen bonding.

Next, referring to FIG. 7 (c), the ultraviolet (UV) light is irradiated to the first substrate and the second substrate, and may be irradiated in the presence of an electric field. By the action of this process, the compound 17 represented by Chemical Formula 1 polymerizes with an adjacent compound 17, to form the first polymer layer 15 and the second polymer layer 25.

In the process of irradiating the ultraviolet (UV) light, which may be under an applied voltage, the reactive mesogens 14 included in the liquid crystal layer polymerize with each other to form the protrusions 13 in the first polymer layer 15 and the second polymer layer 25. With the process of forming the protrusions 13, the liquid crystal molecules 31 are aligned to have a pretilt.

As described above, the manufacturing method of the liquid crystal display according to the exemplary embodiment of the present invention includes no additional coating and drying process of the alignment layer. Instead, it is possible to simplify the processes by forming a polymer layer similar to the alignment layer and protrusions on the polymer layer after the mixture of the compound represented by Chemical Formula 1 and the reactive mesogens are injected to the liquid crystal composition. In addition, since the compound represented by Chemical Formula 1 may include two vertical alignment groups, it is possible to ameliorate the surface afterimage and the black afterimage.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first substrate;
   a second substrate configured to be separated from and overlap the first substrate;
   a liquid crystal layer disposed between the first substrate and the second substrate and including liquid crystal molecules;
   a first polymer layer disposed between the first substrate and the liquid crystal layer;
   a second polymer layer disposed between the second substrate and the liquid crystal layer; and
   a plurality of protrusions disposed in at least one of a first position between the first polymer layer and the liquid crystal layer and a second position between the second polymer layer and the liquid crystal layer,
   wherein the plurality of protrusions include polymers of reactive mesogens, and
   the first polymer layer and the second polymer layer include a polymer of a compound represented by Chemical Formula 1:

[Chemical Formula 1]

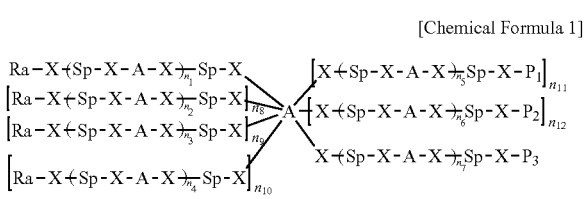

wherein, in Chemical Formula 1,

"A" includes a compound which includes one or more of C, N, an aromatic ring, a heteroaromatic ring, an aliphatic ring, a heterocyclic ring, a condensed ring thereof, a tertiary amine, and two or more ring compounds linked to each other, "X" is independently selected from one of a single bond, —O—, —S—, —CO—, —CO—O—, —OCO—, —O—CO—O—, —OCH$_2$—, —SCH$_2$—, —CH$_2$S—, —CF$_2$O—, —OCF$_2$—, —CF$_2$S—, —SCF$_2$—, —(CH$_2$)$_t$—, —CF$_2$CH$_2$—, —CH$_2$CF$_2$—, —(CF$_2$)$_t$—, —CF=CF—, —C≡C—, —CH=CH—COO—, —OCO—CH=CH—, —R$^0$—, —CH(—Sp-P$_0$)—, —CH$_2$CH(—Sp-P$_0$)—, and —CH(—Sp-P$_0$)CH(—Sp-P$_0$)—, "Sp" is a spacer or a single bond, P$_0$, P$_1$, P$_2$, and P$_3$ are independently selected from one of

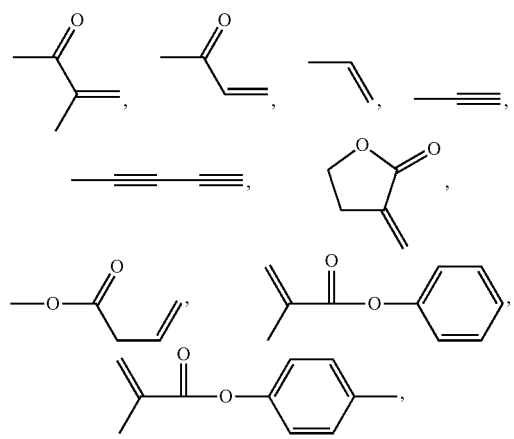

"Ra" is selected from one of —H, —F, —OH, —NH$_2$, —CN, —B(OH)$_2$, —SH, —Br, —I, a heteroaromatic ring, a heterocyclic ring, —OCH$_3$, —OCH$_2$CH$_3$, —OCH$_2$CH$_2$CH$_3$, —O—(CH$_2$—CH$_2$)m-OCH$_3$, —NH(CH$_2$)$_m$CH$_3$, —N((CH$_2$)$_m$CH$_3$)$_2$

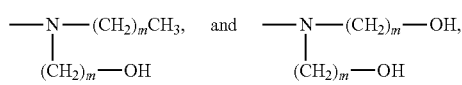

"m" is independently an integer that is in a range of 1 to 4,

"l" is independently an integer that is in a range of 1 to 4,

"$n_1$" to "$n_{12}$" are independently an integer that is in a range of 0 to 1, optionally, "$n_1$" to "$n_{11}$" are independently an integer that is in a range of 0 to 1, and $n_{12}$ is 1, and "$R^0$" is a C1-C12 alkyl group, and wherein the compound represented by Chemical Formula 1 includes one or more of Chemical Formulae 1-1 to 1-14:

[Chemical Formula 1-1]

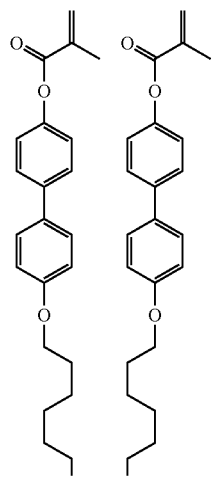

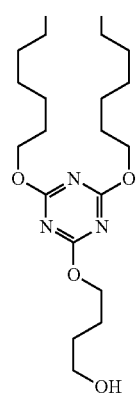

[Chemical Formula 1-2]

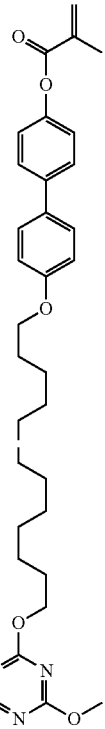

[Chemical Formula 1-3]

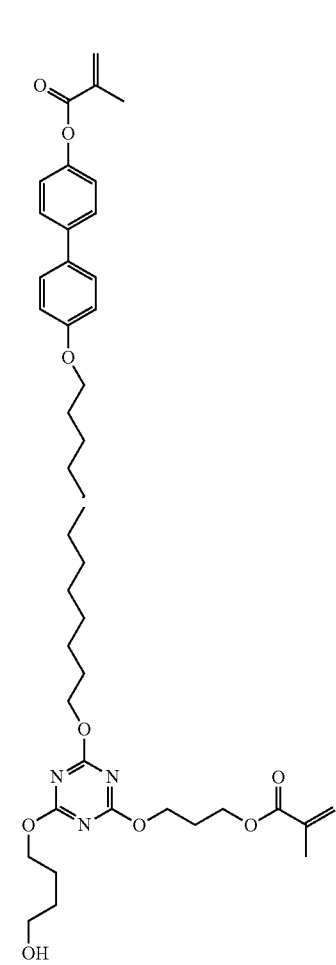

[Chemical Formula 1-4]
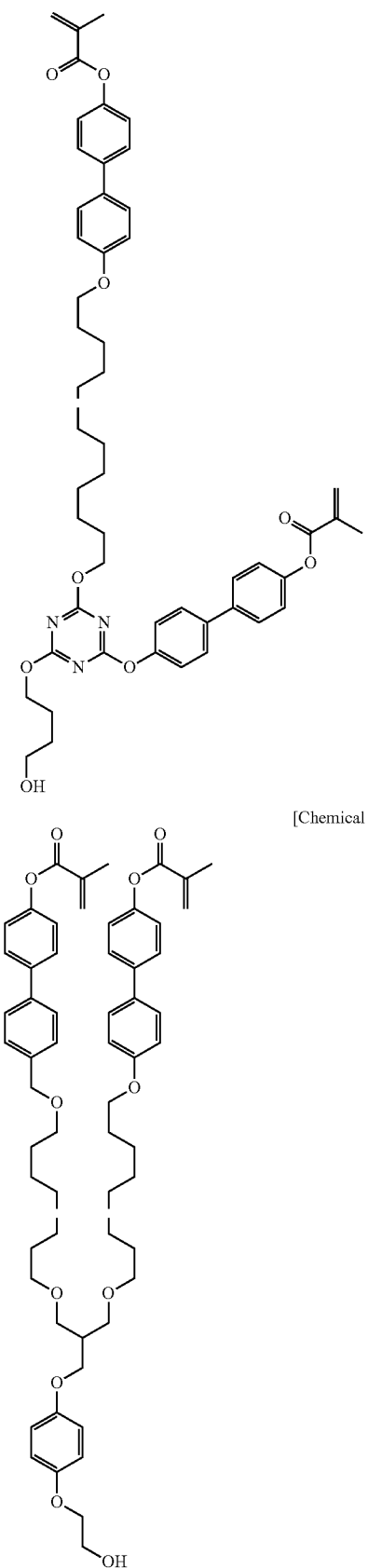
[Chemical Formula 1-5]
[Chemical Formula 1-6]
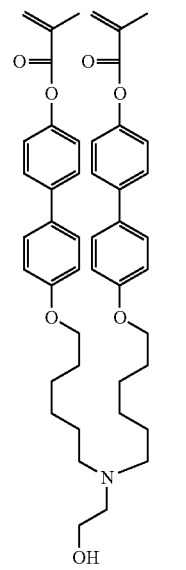
[Chemical Formula 1-7]
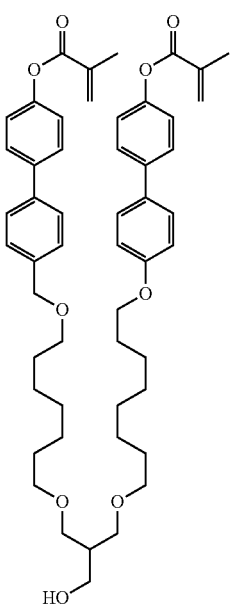
[Chemical Formula 1-8]
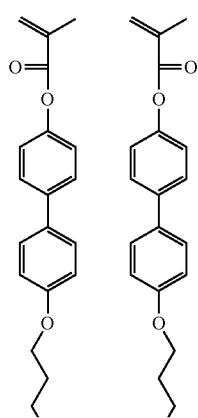

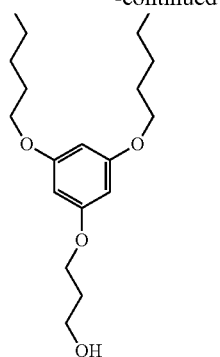
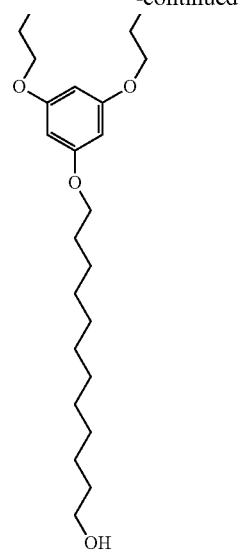
[Chemical Formula 1-9]
[Chemical Formula 1-11]
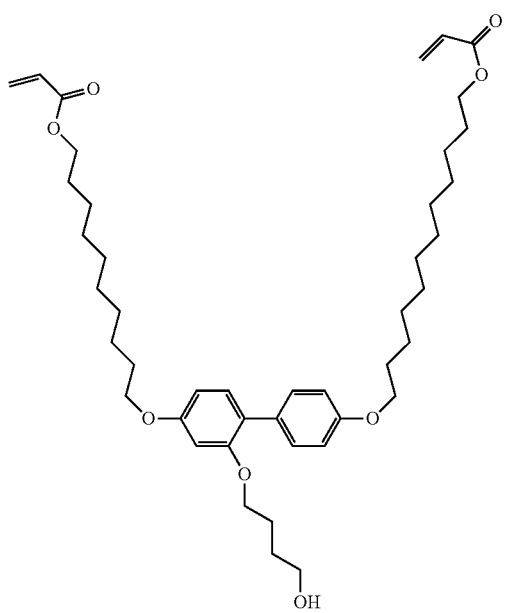
[Chemical Formula 1-10]
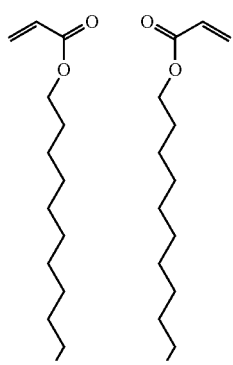
[Chemical Formula 1-12]
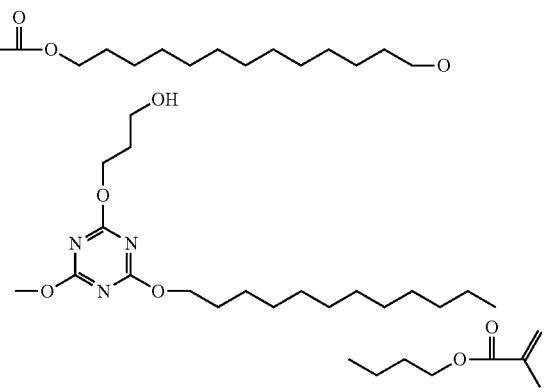

[Chemical Formula 1-13]
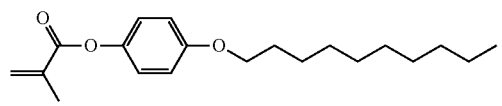
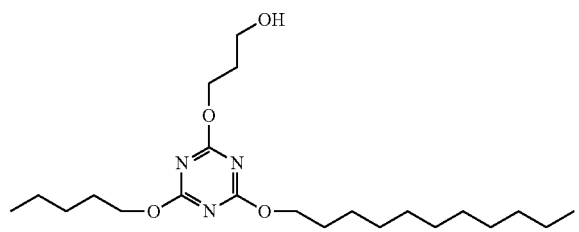
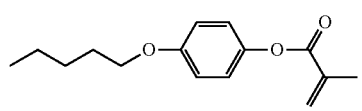
[Chemical Formula 1-14]
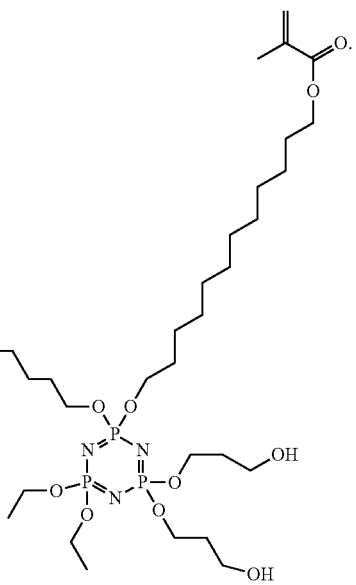
2. The liquid crystal display of claim 1, wherein the reactive mesogens include one or more of Chemical Formulae 2-1 to 2-14:
[Chemical Formula 2-1]
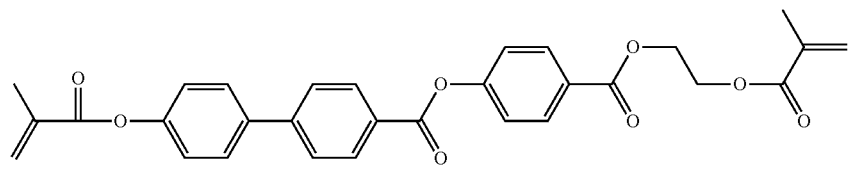
[Chemical Formula 2-2]
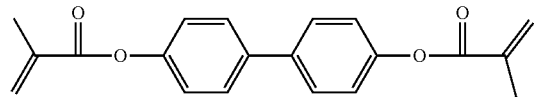
[Chemical Formula 2-3]
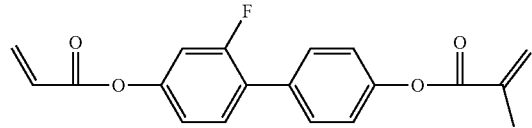
[Chemical Formula 2-4]
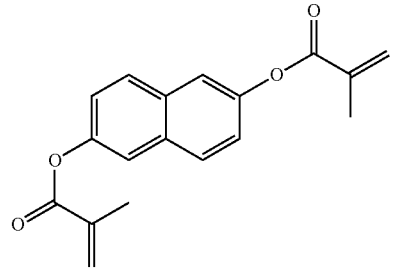
[Chemical Formula 2-5]
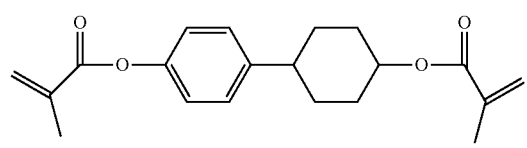

-continued

[Chemical Formula 2-6]

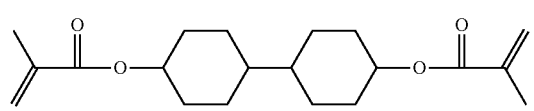

[Chemical Formula 2-7]

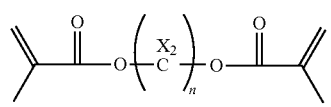

[Chemical Formula 2-8]

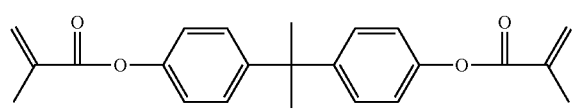

[Chemical Formula 2-9]

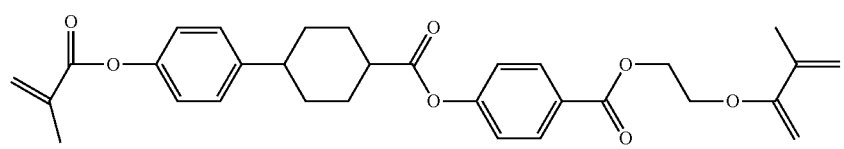

[Chemical Formula 2-10]

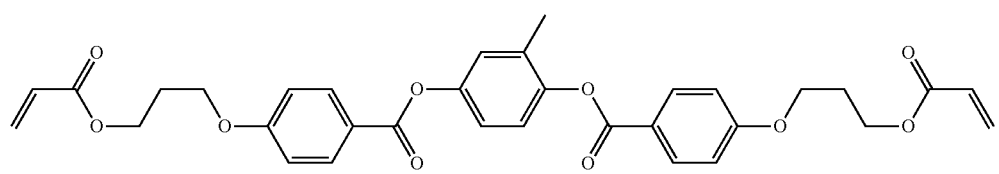

[Chemical Formula 2-11]

[Chemical Formula 2-12]

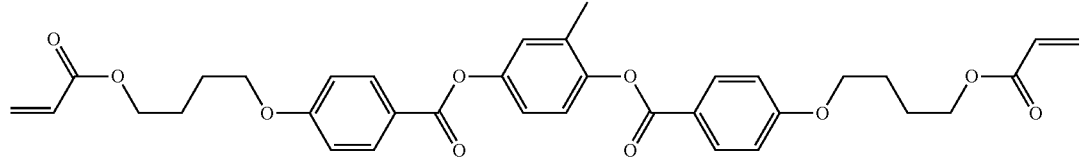

[Chemical Formula 2-13]

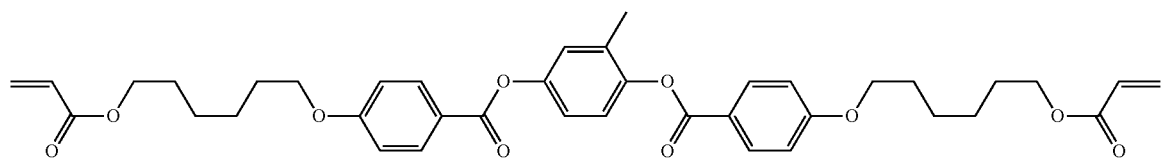

[Chemical Formula 2-14]

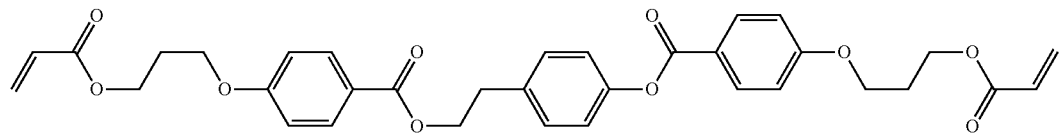

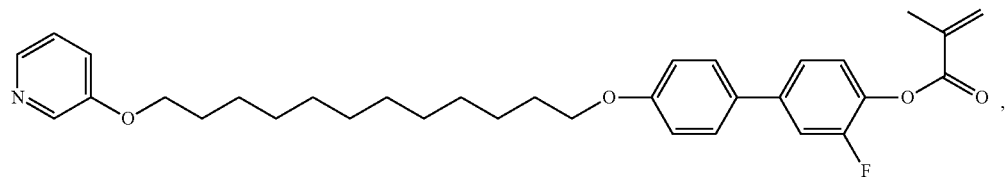

wherein "$X_2$" is selected from one of H, $CH_3$, $(CH_2)_nCH_3$, F, Br, I, OH, $C_3H_7$, $NH_2$, and CN, and n is an integer that is in a range of 1 to 20.

3. The liquid crystal display of claim 1, wherein the compound A represented by Chemical Formula 1 includes one of:

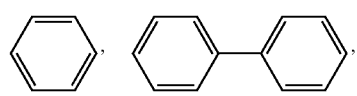

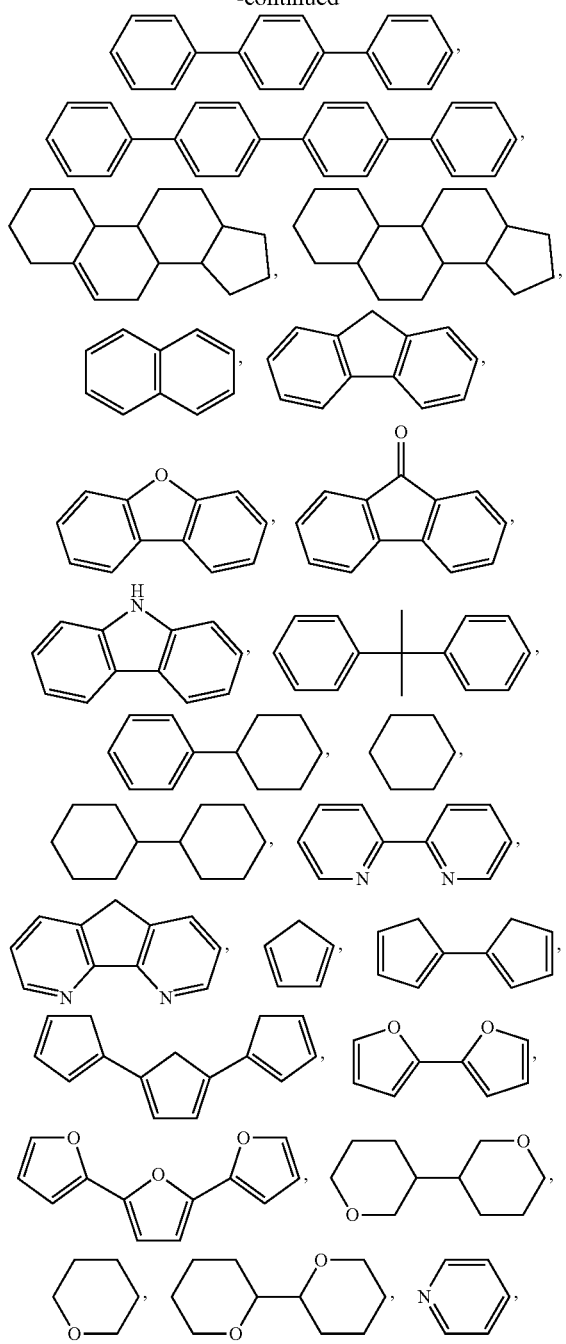
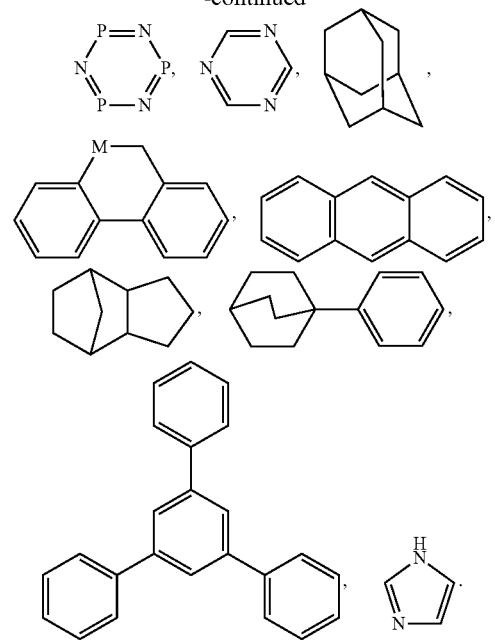

4. The liquid crystal display of claim 1, further comprising:
   a first electrode disposed between the first substrate and the liquid crystal layer; and
   a second electrode disposed between the second substrate and the liquid crystal layer,
   wherein the first polymer layer and the second polymer layer are respectively bonded to the first electrode and the second electrode.

5. The liquid crystal display of claim 4, wherein bonding of the first polymer layer and the first electrode and bonding of the second polymer layer and the second electrode are hydrogen bonding.

6. The liquid crystal display of claim 5, wherein Ra of the first polymer layer is hydrogen-bonded to the first electrode, and Ra of the second polymer layer is hydrogen-bonded to the second electrode.

7. The liquid crystal display of claim 1, wherein $P_1$, $P_2$, or $P_3$ of the compound represented by Chemical Formula 1 polymerizes with $P_1$, $P_2$, or $P_3$ of the compound represented by Chemical Formula 1 adjacent thereto.

8. The liquid crystal display of claim 1, wherein the compound represented by Chemical Formula 1 is further included in the liquid crystal layer.

9. The liquid crystal display of claim 1, wherein the liquid crystal display includes no polyimide alignment layer.

* * * * *